(12) United States Patent
Roberts et al.

(10) Patent No.: US 11,662,297 B2
(45) Date of Patent: May 30, 2023

(54) METHOD FOR INDEX SORTING UNIQUE PHENOTYPES AND SYSTEMS FOR SAME

(71) Applicant: Becton, Dickinson and Company, Franklin Lakes, NJ (US)

(72) Inventors: David Alexander Roberts, San Jose, CA (US); Lingjie Wei, Milpitas, CA (US); Peter Mage, San Jose, CA (US); Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 285 days.

(21) Appl. No.: 17/226,681

(22) Filed: Apr. 9, 2021

(65) Prior Publication Data

US 2021/0333192 A1     Oct. 28, 2021

Related U.S. Application Data

(60) Provisional application No. 63/016,702, filed on Apr. 28, 2020.

(51) Int. Cl.
*G01N 15/14*     (2006.01)

(52) U.S. Cl.
CPC ....... *G01N 15/147* (2013.01); *G01N 15/1434* (2013.01); *G01N 2015/1447* (2013.01); *G01N 2015/1493* (2013.01)

(58) Field of Classification Search
CPC ............ G01N 15/147; G01N 15/1434; G01N 2015/1447; G01N 2015/1493; G01N 15/1429; G01N 2015/1006; G01N 2015/1481; G01N 15/1459; G01N 15/1463; G01N 2015/149
See application file for complete search history.

(56) References Cited

U.S. PATENT DOCUMENTS

| | | | |
|---|---|---|---|
| 11,327,003 B2 * | 5/2022 | Lin | G01N 15/1434 |
| 2004/0260157 A1 * | 12/2004 | Montes | G01N 15/1475 600/301 |
| 2007/0026382 A1 * | 2/2007 | Lynes | G01N 33/5091 435/7.2 |
| 2008/0268469 A1 | 10/2008 | Srienc et al. | |

(Continued)

FOREIGN PATENT DOCUMENTS

KR     20190069322 A     6/2019

*Primary Examiner* — Roy M Punnoose
(74) *Attorney, Agent, or Firm* — Bret E. Field; Bozicevic, Field & Francis LLP

(57) ABSTRACT

Aspects of the present disclosure include methods for flow cytometrically sorting a sample with particles, such as cells, based on order of identification. Methods according to certain embodiments include introducing the sample into a flow cytometer; flowing the introduced sample in a flow stream; irradiating the sample in the flow stream with a light source; detecting light from cells in the sample flowing in the flow stream; identifying phenotypes of cells in the sample flowing in the flow stream based on one or more data signals generated from the detected light; and dynamically sorting into partitions cells of the sample that have a phenotype of a collection of predetermined phenotypes based on order of identification. Systems for practicing the subject methods are also provided. Non-transitory computer readable storage mediums are also described.

19 Claims, 9 Drawing Sheets

(56) References Cited

U.S. PATENT DOCUMENTS

| | | |
|---|---|---|
| 2009/0042737 A1 | 2/2009 | Katz et al. |
| 2012/0122084 A1* | 5/2012 | Wagner ................ G01N 15/147 |
| | | 435/6.1 |
| 2012/0220022 A1* | 8/2012 | Ehrlich .................. G01N 15/14 |
| | | 435/286.2 |
| 2012/0258488 A1 | 10/2012 | Abilez et al. |
| 2020/0292526 A1* | 9/2020 | Hause, Jr. .......... G01N 33/6854 |

\* cited by examiner

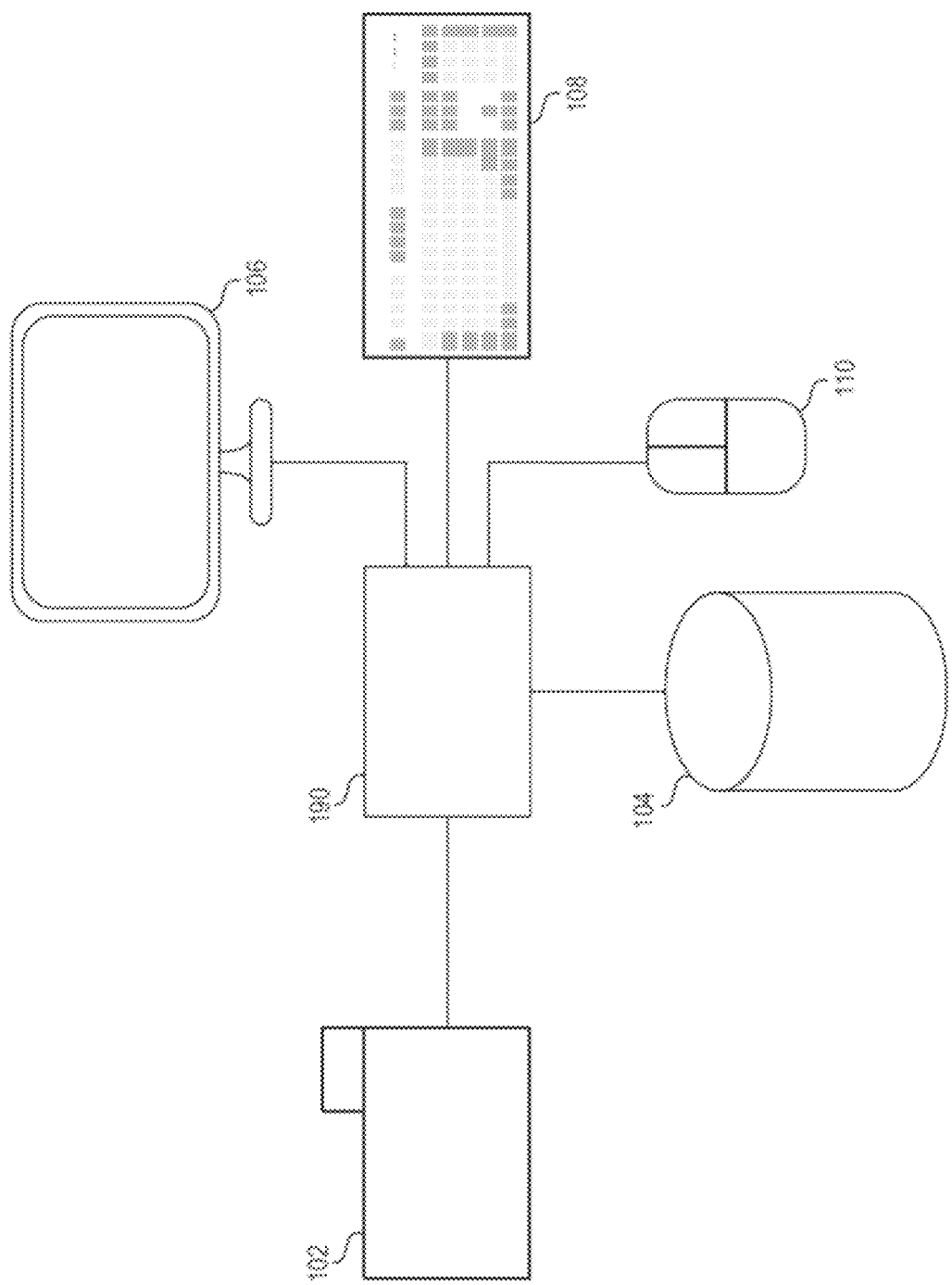

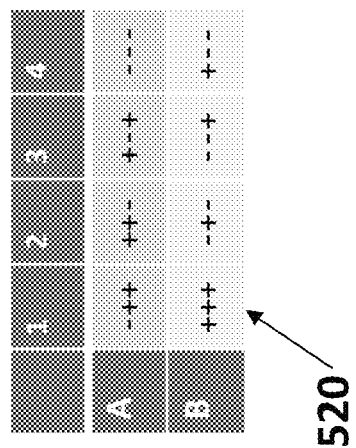
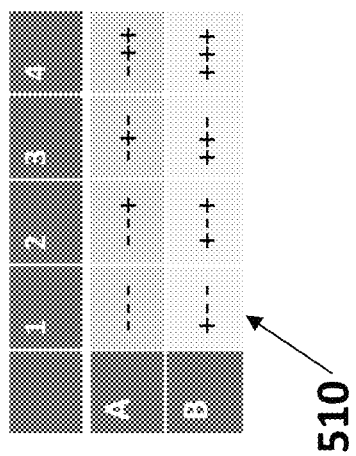
Figure 5

METHOD FOR INDEX SORTING UNIQUE PHENOTYPES AND SYSTEMS FOR SAME

CROSS-REFERENCE TO RELATED APPLICATION

Pursuant to 35 U.S.C. § 119(e), this application claims priority to the filing date of U.S. Provisional Patent Application Ser. No. 63/016,702 filed Apr. 28, 2020; the disclosure of which application is herein incorporated by reference.

INTRODUCTION

Flow-type particle sorting systems, such as sorting flow cytometers, are used to sort particles in a fluid sample based on at least one measured characteristic of the particles. In a flow-type particle sorting system, particles, such as molecules, analyte-bound beads, or individual cells, in a fluid suspension are passed in a stream by a detection region in which a sensor detects particles contained in the stream of the type to be sorted. The sensor, upon detecting a particle of the type to be sorted, triggers a sorting mechanism that selectively isolates the particle of interest. Sorted particles of interest are isolated into partitions, such as, for example, sample containers, test tubes or wells of a multi-well plate.

Particle sensing typically is carried out by passing the fluid stream by a detection region in which the particles are exposed to irradiating light, from one or more lasers, and the light scattering and fluorescence properties of the particles are measured. Particles or components thereof can be labeled with fluorescent dyes to facilitate detection, and a multiplicity of different particles or components may be simultaneously detected by using spectrally distinct fluorescent dyes to label the different particles or components. Detection is carried out using one or more photosensors to facilitate the independent measurement of the fluorescence of each distinct fluorescent dye.

To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more partitions, such as sample collection containers. Uncharged droplets are not deflected by the electrostatic field.

SUMMARY

Aspects of the present disclosure include methods for flow cytometrically sorting a sample with particles, such as cells, based on order of identification. Methods according to certain embodiments include introducing the sample into a flow cytometer, flowing the introduced sample in a flow stream, irradiating the sample in the flow stream with a light source, detecting light from cells in the sample flowing in the flow stream, identifying phenotypes of cells in the sample flowing in the flow stream based on one or more data signals generated from the detected light, and dynamically sorting into partitions cells of the sample that have a phenotype of a collection of predetermined phenotypes based on order of identification. Systems for practicing the subject methods are also provided. Non-transitory computer readable storage mediums are also described.

In some embodiments, a first phenotype is excluded from the collection of phenotypes after sorting a predetermined number of cells that have the first phenotype. In other embodiments, a predetermined number of cells are sorted into a partition. In each instance, the predetermined number of cells may be, for example, one or two or ten or 100 or more.

In some embodiments, the partitions comprise wells. For instance, the wells may be wells of a multi-well plate. In some embodiments, the multi-well plate is advanced to a second well after sorting a predetermined number of cells into a first well. The predetermined number of cells may be, for instance, one or two or ten or 100 or more.

In some embodiments, phenotypes of cells sorted into partitions are recorded. Phenotypes of cells sorted into partitions may be recorded by, for example, adding representations of cell phenotypes to a list, a probabilistic data structure, an associative array or a truth table. In some instances, the record of previously sorted phenotypes is queried prior to sorting a cell. In embodiments, the list of phenotypes or the probabilistic data structure or the associative array or the truth table may be queried to determine whether or not a first cell has already been sorted, wherein the first cell has a phenotype also exhibited by a second cell. In some instances, the probabilistic data structure may be a Bloom filter. In these instances, hash functions used in connection with the Bloom filter are selected to reduce collisions in the Bloom filter based on an analysis of the sample. In some embodiments, the associative array is a content addressable memory.

In some embodiments, information identifying a partition and a phenotype of a cell sorted into the partition is recorded. For instance, a list identifying partitions and phenotypes of cells sorted into the partitions may be maintained. In some embodiments, an estimate, based on a subset of cells in the sample, is made of a number of phenotypes exhibited by cells in the sample.

In certain instances, methods comprise deflecting cells into a first partition and a second partition. In these embodiments, the cells in the sample may be divided into a first group that exhibits a first collection of phenotypes, comprising a predetermined number of phenotypes, and a second group that does not exhibit the first collection of phenotypes. In such embodiments, the first group may be sorted into one of the first partition or the second partition, based on order of identification. In some instances, the first collection of phenotypes used to divide cells into a first group and a second group are determined so that the first group and the second group comprise substantially the same number of cells. In these embodiments, the method may further comprise dynamically updating the first collection of phenotypes based on sorted cells in the sample so that the first group and the second group comprise substantially the same number of cells.

In embodiments, cell phenotypes are identified based on one or more values of parameters that are determined from the data signals generated from the detected light. In instances, certain values of a parameter of a cell indicate an indeterminate state of whether the cell has a phenotype. In such embodiments, a cell may not be sorted when it exhibits an indeterminate state of whether the cell has a phenotype.

In some embodiments, the method includes estimating an amount of fluorescent spillover measured with respect to a single data signal based on a predicted variance-covariance matrix of unmixed data for a sorted cell. In these embodiments, the method may include estimating a covariance between two fluorophores based on the predicted variance-covariance matrix of unmixed data for the sorted cell. In these embodiments, thresholds may be defined for expression for a fluorophore based on the estimated covariance between fluorophores. In such embodiments, the method may include defining a measure of uncertainty with respect to the phenotype exhibited by a sorted cell based on the estimated covariance between fluorophores.

In certain instances, samples of interest include a plurality of fluorophores where the fluorescence spectra of each fluorophore overlap with the fluorescence spectra of at least one other fluorophore in the sample. For example, the fluorescence spectra of each fluorophore may overlap with the fluorescence spectra of at least one other fluorophore in the sample by 10 nm or more, such as 25 nm or more and including by 50 nm or more. In some instances, the fluorescence spectra of one or more fluorophores in the sample overlaps with the fluorescence spectra of two different fluorophores in the sample, such as by 10 nm or more, such as by 25 nm or more and including by 50 nm or more. In other embodiments, samples of interest include a plurality of fluorophores having non-overlapping fluorescence spectra. In these embodiments, the fluorescence spectra of each fluorophore is adjacent to at least one other fluorophore within 10 nm or less, such as 9 nm or less, such as 8 nm or less, such as 7 nm or less, such as 6 nm or less, such as 5 nm or less, such as 4 nm or less, such as 3 nm or less, such as 2 nm or less and including 1 nm or less.

In embodiments, the collection of predetermined phenotypes comprises a cell type with one or more cell subtypes. For instance, the cell type may be T cell. In such embodiments, the cell subtypes may include CD4+ T cells or CD8+ T cells.

Aspects of the present disclosure also include systems having a light detection system for characterizing particles of a sample in a flow stream (e.g., cells in a biological sample). Systems according to certain embodiments include a light source configured to irradiate the sample comprising cells flowing in a flow stream, a light detection system comprising a photodetector for detecting light from the cells in the sample and generating a plurality of data signals from the detected light, a cell sorter configured to receive the sample comprising cells flowing in the flow stream, a plurality of partitions configured to receive cells from the sample sorted by the cell sorter, and a processor comprising memory operably coupled to the processor, wherein the memory comprises instructions stored thereon, which, when executed by the processor, cause the processor to: identify phenotypes of cells in the sample based on one or more of the data signals generated from the detected light and instruct the cell sorter to dynamically sort into the partitions cells of the sample that have a phenotype of a collection of predetermined phenotypes based on order of identification.

In embodiments, the memory includes instructions stored thereon which when executed by the processor cause the processor to instruct the cell sorter to stop sorting a first phenotype from the collection of phenotypes after a predetermined number of cells that have the first phenotype are sorted. In other embodiments, the memory includes instructions stored thereon which when executed by the processor cause the processor to instruct the cell sorter to dynamically sort a predetermined number of cells into a partition. The predetermined number of cells may be, for instance, one, two, ten or 100 or more.

In instances, the partitions may comprise wells. In some cases, the wells are wells of a multi-well plate. In some embodiments, systems comprise a translatable support stage configured to move the multi-well plate, wherein the memory comprises instructions stored thereon, which, when executed by the processor, cause the processor to instruct the support stage to move the multi-well plate to a second well after sorting a predetermined number of cells into a first well.

In some embodiments, the memory comprises instructions stored thereon, which, when executed by the processor, cause the processor to store the phenotypes of cells sorted into partitions. In these embodiments, the memory may comprise instructions stored thereon, which, when executed by the processor, cause the processor to store the phenotypes of cells sorted into partitions by adding representations of phenotypes of sorted cells to a list of phenotypes, a probabilistic data structure, an associative array or a truth table. In some embodiments, the memory comprises instructions stored thereon, which, when executed by the processor, cause the processor to query the list of phenotypes, the probabilistic data structure, the associative array or the truth table, as applicable, to determine whether or not a first cell has already been sorted, wherein the first cell has a phenotype also exhibited by a second cell. In some instances, the probabilistic data structure is a Bloom filter. In some instances, the associative array is a content addressable memory.

In some embodiments, the memory comprises instructions stored thereon, which, when executed by the processor, cause the processor to store information identifying a partition and a phenotype of a cell sorted into the partition. In these embodiments, the memory may comprise instructions stored thereon, which, when executed by the processor, cause the processor to maintain a list identifying partitions and phenotypes of cells sorted into the partitions.

In some embodiments, the memory comprises instructions stored thereon, which, when executed by the processor, cause the processor to instruct the cell sorter to: dynamically sort into a first partition cells of the sample that exhibit a first collection of phenotypes, comprising one or more phenotypes, based on order of identification, and dynamically sort into a second partition cells of the sample that do not exhibit the first collection of phenotypes. In these embodiments, the memory may comprise instructions stored thereon, which, when executed by the processor, cause the processor to dynamically update the first collection of phenotypes based on sorted cells in the sample so that cells sorted into the first partition and cells sorted into the second partition comprise substantially the same number of cells.

In some embodiments, the memory comprises instructions stored thereon, which, when executed by the processor, cause the processor to not sort a cell exhibiting an indeterminate phenotype.

In some embodiments, the memory comprises instructions stored thereon, which, when executed by the processor, cause the processor to calculate an estimate of an amount of fluorescent spillover measured with respect to a single data signal based on a predicted variance-covariance matrix of unmixed data for a sorted cell. In such embodiments, the memory may comprise instructions stored thereon, which, when executed by the processor, cause the processor to calculate an estimate of a covariance between two fluorophores based on the predicted variance-covariance matrix of unmixed data for the sorted cell. In these embodiments, the memory may comprise instructions stored thereon, which, when executed by the processor, cause the processor to calculate thresholds for expression for a fluorophore based on the estimated covariance between fluorophores. In such embodiments, the memory may comprise instructions stored thereon, which, when executed by the processor, cause the processor to calculate a measure of uncertainty with respect to the phenotype exhibited by a sorted cell based on the estimated covariance between fluorophores.

In some embodiments, systems of interest may include one or more sort decision modules configured to generate a sorting decision for the particle based on the classification of the particle. In embodiments, systems further include a cell sorter (e.g., having a droplet deflector) for sorting the particles, such as cells, from the flow stream based on the sort decision generated by the sort decision module.

Aspects of the present disclosure also include a non-transitory computer readable storage medium for sorting a sample with particles, such as cells, based on order of identification. Non-transitory computer readable storage mediums according to certain embodiments include instructions stored thereon having algorithm for identifying cell phenotypes based on one or more data signals generated from light detected from cells of the sample and algorithm for instructing a cell sorter to dynamically sort into partitions cells that have a phenotype of a collection of predetermined phenotypes based on order of identification. The non-transitory computer readable storage medium may also include algorithm for instructing the cell sorter to stop sorting a first phenotype from the collection of phenotypes after a predetermined number of cells that have the first phenotype are sorted. The non-transitory computer readable storage medium may also include algorithm for instructing the cell sorter to dynamically sort a predetermined number of cells into a partition. The non-transitory computer readable storage medium may also include algorithm for instructing a support stage to move a multi-well plate to a second well after a predetermined number of cells are sorted into a first well. In these embodiments, the predetermined number may be one.

In some embodiments, the non-transitory computer readable storage medium may also include algorithm for recording the phenotypes of cells sorted into partitions. In such embodiments, the computer readable storage medium may include algorithm for recording the phenotypes of cells sorted into partitions by adding representations of phenotypes of sorted cells to, for instance, a list of phenotypes, a probabilistic data structure, an associative array or a truth table.

In these embodiments, the computer readable storage medium may include algorithm for querying, as applicable, the list of phenotypes, the probabilistic data structure, the associative array or the truth table to determine whether or not a first cell has already been sorted, wherein the first cell has a phenotype also exhibited by a second cell. In some cases, the probabilistic data structure is a Bloom filter. In some cases, the associative array is a content addressable memory.

In some embodiments, the non-transitory computer readable storage medium may also include algorithm for recording information identifying a partition and a phenotype of a cell sorted into the partition. In these embodiments, the non-transitory computer readable storage medium may include algorithm for maintaining a list identifying partitions and phenotypes of cells sorted into the partitions.

In some embodiments, the non-transitory computer readable storage medium may also include algorithm for instructing the cell sorter to: dynamically sort into a first partition cells of the sample that exhibit a first collection of phenotypes, comprising one or more phenotypes, based on order of identification, and dynamically sort into a second partition cells of the sample that do not exhibit the first collection of phenotypes. In these instances, the non-transitory computer readable storage medium may include algorithm for dynamically updating the first collection of phenotypes based on sorted cells in the sample so that cells sorted into the first partition and cells sorted into the second partition comprise substantially the same number of cells. In some embodiments, the non-transitory computer readable storage medium may also include algorithm for not sorting a cell exhibiting an indeterminate phenotype.

In some embodiments, the non-transitory computer readable storage medium may also include algorithm for calculating an estimate of an amount of fluorescent spillover measured with respect to a single data signal based on a predicted variance-covariance matrix of unmixed data for a sorted cell. In these embodiments, the computer readable storage medium may also include algorithm for calculating an estimate of a covariance between two fluorophores based on the predicted variance-covariance matrix of unmixed data for the sorted cell. In these embodiments, the computer readable storage medium may also include algorithm for calculating thresholds for expression for a fluorophore based on the estimated covariance between fluorophores. In these embodiments, the computer readable storage medium may also include algorithm for calculating a measure of uncertainty with respect to the phenotype exhibited by a sorted cell based on the estimated covariance between fluorophores.

BRIEF DESCRIPTION OF THE FIGURES

The invention may be best understood from the following detailed description when read in conjunction with the accompanying drawings. Included in the drawings are the following figures:

FIG. 1 depicts a functional block diagram for one example of a sorting control system according to certain embodiments.

FIG. 5 depicts resulting partitions from sorting a sample according to certain embodiments of the present disclosure.

DETAILED DESCRIPTION

Figure 2A:
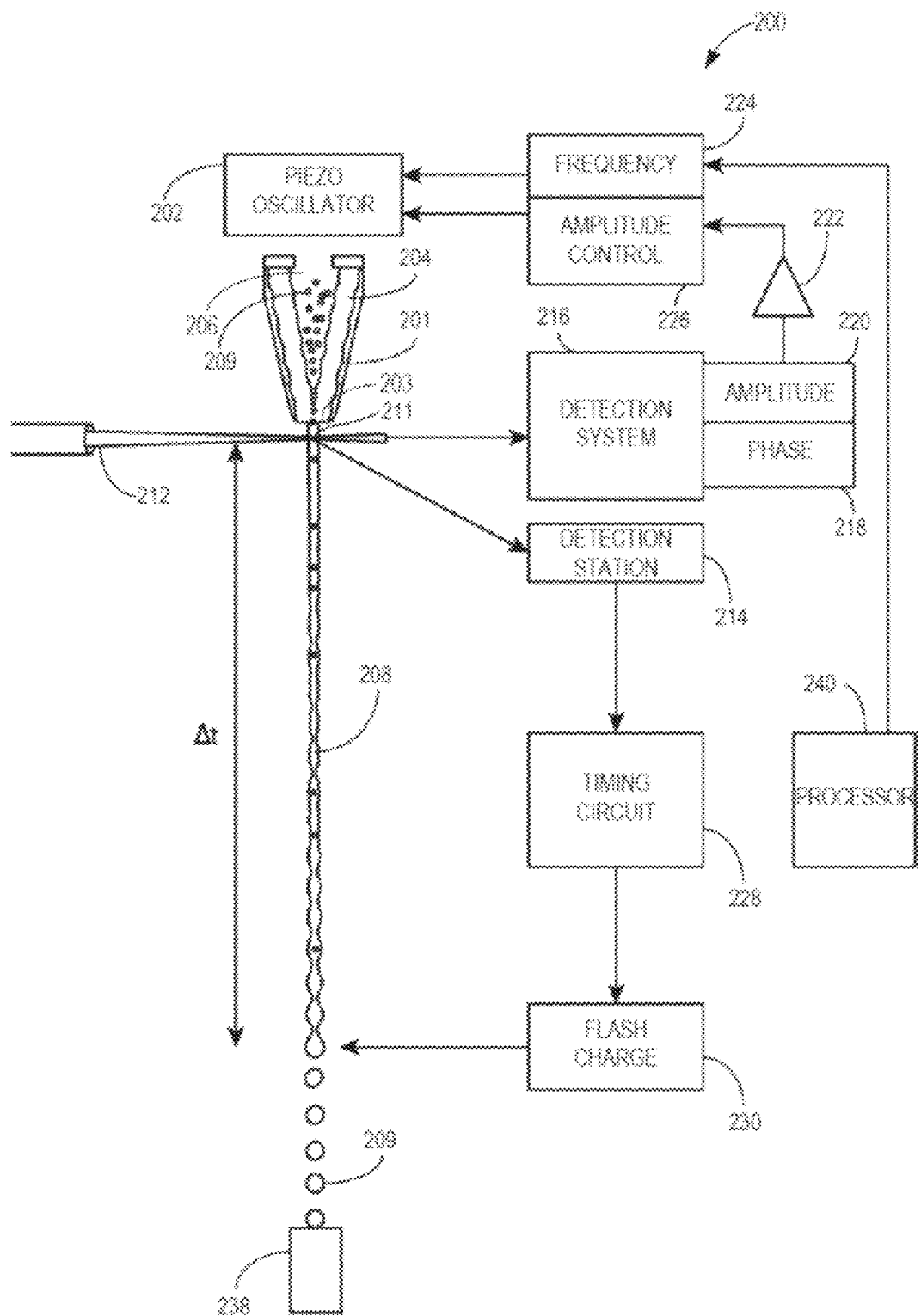
FIG. 2A depicts a schematic drawing of a particle sorter system according to certain embodiments.

Aspects of the present disclosure include methods for flow cytometrically sorting a sample with particles, such as cells, based on order of identification. Methods according to certain embodiments include introducing the sample into a flow cytometer, flowing the introduced sample in a flow stream, irradiating the sample in the flow stream with a light source, detecting light from cells in the sample flowing in the flow stream, identifying phenotypes of cells in the sample flowing in the flow stream based on one or more data signals generated from the detected light, and dynamically sorting into partitions cells of the sample that have a phenotype of a collection of predetermined phenotypes based on order of identification. Systems for practicing the subject methods are also provided. Non-transitory computer readable storage mediums are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention.

The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for flow cytometrically sorting a sample with particles, such as cells, based on order of identification. In further describing embodiments of the disclosure, methods for limiting the number of cells sorted that have a particular phenotype, limiting the number of cells sorted into each partition, recording cell phenotypes that have been sorted, deflecting cells into two wells, and adjusting for spectral spillover are first described in greater detail. Next, systems to practice the subject methods are described. Non-transitory computer readable storage mediums are also described.

Methods for Flow Cytometrically Sorting a Sample with Particles, Such as Cells, Based on Order of Identification Aspects of the present disclosure include methods for flow cytometrically sorting a sample with particles, such as cells, based on order of identification. In particular, the present disclosure includes methods for dynamically sorting into partitions particles, such as cells, of the sample that have a phenotype of a collection of predetermined phenotypes based on order of identification. By "dynamically sorting based on order of identification" it is meant sorting particles, such as cells, of interest in the order in which such cells appear in, for example, a flow stream. That is, for example, particles of interest are sorted as and when they are identified in a flow stream during sorting. As described in greater detail herein, the subject methods according to certain embodiments provide for excluding a first phenotype from the collection of phenotypes after sorting a predetermined number of cells that have the first phenotype. In other embodiments, the subject methods according to certain embodiments provide for sorting a predetermined number of cells into a partition. In some embodiments, the subject methods provide for recording the phenotypes of cells sorted into partitions. Sorting particles, such as cells, according to the subject methods results in increased sorting efficiency, such that fewer particles of a sample are wasted (i.e., disposing of particles, such as cells, such that they go unsorted) when sorting a sample. In some cases, the efficiency of sorting may be improved such that more variations of cell phenotypes may be collected and sorted when the subject systems and methods are employed. When used as part of flow cytometrically sorting a sample, the subject methods can improve the yield of particle sorting.

In practicing the subject methods, a sample having particles is irradiated with a light source and light from the sample is detected with a light detection system having one or more photodetectors. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In embodiments, a sample (e.g., in a flow stream of a flow cytometer) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, a multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The sample may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be a plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g., laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the sample is sequentially irradiated with two or more light sources, the duration the sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating the sample with two or more beams of frequency shifted light. A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. Nature Photonics Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

As discussed above, in embodiments light from the irradiated sample is conveyed to a light detection system as described in greater detail below and measured by the plurality of photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the sample may be measured at one or more wavelengths of, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

Methods of the present disclosure include flow cytometrically sorting a sample with particles, such as cells, based on order of identification. In embodiments, phenotypes of cells in the sample flowing in the flow stream are identified based on one or more data signals generated from detected light from the cells. The data signals generated may be analog data signals or digital data signals. Where the data signals are analog data signals, in some instances, methods include converting the analog data signals to digital data signals, such as with an analog-to-digital converter. In some instances, identifying a cell phenotype includes assigning the cell to a cell population cluster. In other instances, identifying a cell phenotype includes plotting one or more data signals generated from detected light of the cell onto a scatter plot. In certain instances, identifying cell phenotypes in the sample includes generating a two-dimensional bitmap having a region of interest (ROI) and determining whether a particle should be assigned to the ROI of the bitmap.

In embodiments, cells of the sample that have a phenotype of a collection of predetermined phenotypes are dynamically sorted based on order of identification. In some instances, the collection of predetermined phenotypes may include one or more distinct and distinguishable cell phenotypes, such as one cell phenotype, such as two cell phenotypes, such as 16 cell phenotypes, such as 256 cell phenotypes or more. For example, the collection of cell phenotypes may be a collection of 32 different cell phenotypes. In embodiments, a first phenotype may be excluded from the collection of phenotypes after sorting a predetermined number of cells that have the first phenotype. In some instances, the predetermined number of cells that have the first phenotype may be one or more. For example, the predetermined number of cells may be one or two or ten or 100 or more.

Upon "excluding a first phenotype from the collection of phenotypes," the collection of predetermined phenotypes no longer includes the first phenotype such that, for example, if, prior to excluding the first phenotype, the collection of phenotypes included 64 phenotypes, then after excluding the first phenotype, the collection of phenotypes would include 63 phenotypes. Further, after a first phenotype is excluded from the collection of phenotypes, upon continued sorting of the sample in the flow stream, cells that have a first phenotype would no longer have a phenotype included in the collection of phenotypes since the first phenotype was excluded from the collection of phenotypes, and, as a result, cells having the first phenotype would no longer be sorted into partitions.

By "sorting based on order of identification," it is meant, for example, sorting cells in the order in which such cells appear in, for example, a flow stream. In other words, cells may be sorted as and when they appear in, for example, a flow stream during sorting. That is, in some embodiments, upon identifying the phenotype of a cell in the flow stream, the cell phenotype may be compared against each phenotype comprising the collection of phenotypes and sorted into a partition upon confirmation that the cell phenotype is included in the collection of phenotypes. In some cases, a result of dynamically sorting based on order of identification is that the order in which cell phenotypes are identified and sorted is not determined in advance of commencing sorting a sample, but, instead, is determined "dynamically" or currently with sorting. In some cases, the order in which cells are identified and sorted based on order of identification may vary from one sample to another.

In contrast, for example, when cells are not sorted dynamically based on order of identification according to the present disclosure, they may be sorted into a plurality of partitions where it is predetermined prior to commencing sorting which cell phenotypes will be sorted into which partition. For example, when cells are not sorted dynamically based on order of identification according to the present disclosure, a cell with a phenotype identified as belonging to a collection of cell phenotypes to be sorted but nonetheless not having the phenotype assigned to the next partition, may be disposed of without being sorted. When cells are dynamically sorted based on order of identification in accordance with the present disclosure, the next partition would be dynamically assigned such cell phenotype, and the identified cell would be sorted accordingly. As a result, the identified cell would not be wasted.

FIG. 5 depicts two example sorting methods, one example 501 where sorting occurs dynamically based on order of identification, as in certain embodiments of the methods of the present disclosure, and another example 502 where sorting does not occur dynamically based on order of identification.

Multi-well plate 510 into which cells are sorted according to a method where sorting does not occur dynamically based on order of identification includes eight wells, identified by their rows, "A" or "B" and their columns "1", "2", "3" or "4". Each well is assigned a string consisting of three characters, a combination of "+"s and "−"s. Each position within the string indicates a constituent characteristic of a cell phenotype, where the "+" or "−" indicates the presence or absence, respectively, of such characteristic of a cell phenotype. Each well of multi-well plate 510 is assigned a cell phenotype corresponding to the well in advance of commencing sorting. That is, when practicing such a method, both (i) determining a collection of cell phenotypes as well as (ii) an assignment of each phenotype to each well occurs in advance of commencing cell sorting. Such assignment in advance of sorting is emphasized in FIG. 5 for illustrative purposes by the order, corresponding to counting in binary from left to right within each row, of cell phenotypes among the wells. Upon commencing cell sorting at, for example, well A1, cells in the flow stream are identified and discarded until the first instance occurs in the flow stream of a cell identified as exhibiting a phenotype corresponding to "−−−", the cell phenotype assigned to well A1. After sorting a predetermined number of cells exhibiting a phenotype corresponding to "−−−", cells in the flow stream are identified and discarded until the first instance occurs in the flow stream of a cell identified as exhibiting a phenotype corresponding to "−−+", the cell phenotype assigned to well A2. The sorting process continues as such.

Multi-well plate 520 into which cells are sorted according to a method where sorting does occur dynamically based on order of identification according to embodiments of the present disclosure also includes eight wells, identified by their rows, "A" or "B" and their columns "1", "2", "3" or "4". The cell phenotypes labeled as corresponding to each well are assigned to each well during cell sorting, i.e., cells are dynamically sorted. That is, instead of such phenotypes being assigned in advance, each well of multi-well plate 520 is assigned a cell phenotype dynamically while sorting is ongoing based on the order in which a cell belonging to a collection of predetermined phenotypes is identified in the flow stream. When practicing such a method, only determining a collection of cell phenotypes must occur in advance of commencing cell sorting, and not the assignment of a cell phenotype to each well in advance. In the instant example, if sorting began at well A1, then the first cell in the flow stream identified as belonging to the collection of predetermined phenotypes had a phenotype of "−++". The apparent random order of cell phenotypes distributed across wells of multi-well plate 520 illustrates the unpredictable order in which cells are identified in the flow stream during sorting.

In some embodiments, a predetermined number of cells are sorted into a partition. For instance, the predetermined number may be one or more. For example, a single cell may be sorted into a partition or two cells or ten cells or 100 cells or more may be sorted into a partition. In some cases, partitions comprise wells. Wells may be any size with the capacity of holding particles, such as cells. For example, well volume may be 0.001 mL or greater, such as 0.005 mL or 0.015 mL or 0.1 mL or 2 mL or 5 mL or greater. In some embodiments, the wells may be wells of a multi-well plate. A multi-well plate may include any number of wells. In instances, a multi-well plate may include six or 12 or 24 or 48 or 96 or 384 or 1536 or 3456 or 9600 or more wells. Wells of a multi-well plate may be arranged in any convenient pattern. In some instances, wells are arranged in a rectangular shape with a length to width ration of approximately two to three. In some instances, multi-well plates of the present disclosure may conform to accepted standards such as the standard established by the Society for Biomolecular Sciences with the ANSI-Standards. Multi-well plates may be composed of any convenient material. In some cases, multi-well plates may be composed of polypropylene, polystyrene or polycarbonate. In some embodiments, the multi-well plate is advanced to a second well after sorting a predetermined number of cells into a first well.

Certain embodiments also include recording the phenotypes of cells sorted into partitions. In some cases, representations of cell phenotypes are recorded by storing a representation of a cell phenotype upon sorting a cell having such phenotype. For example, some embodiments may record the phenotypes of cells sorted into partitions by adding representations of phenotypes of sorted cells to a list of phenotypes. By representations of phenotypes, it is meant any practical summary of a cell phenotype capable of distinguishing such cell phenotype from other cell phenotypes capable of being identified. For example, a representation of a cell phenotype may include a bit string where each position in the bit string corresponds to an individual constituent characteristic of a cell phenotype. The bits of such a bit string would indicate whether the constituent characteristics of a cell phenotype are present or absent. For example, a bit position may be set to "1" when the corresponding characteristic of the cell phenotype is present and "0" when absent.

The list of sorted cell phenotypes may take any convenient form. For example, a list may comprise an array of bit strings, where each bit string corresponds to a representation of a phenotype of a sorted cell. The array may be any convenient size and may vary. For example, in some instances, the size of the array may correspond to the number of phenotypes in the collection of phenotypes multiplied by the predetermined number of cells to be sorted having each phenotype. In some cases, the size of the array may be increased as sorting progresses. In other instances, a list may comprise a linked list, where each element of the linked list includes a representation of a phenotype of a sorted cell as well as a link to the next entry in the linked list, if any.

In some embodiments, this method may further include querying the list of phenotypes to determine whether or not a first cell has already been sorted, wherein the first cell has a phenotype also exhibited by a second cell. By querying the list of phenotypes, it is meant that the list is searched to determine whether the list contains an identified phenotype. In some cases, an implication of the list including such phenotype is that a first cell with such phenotype has already been sorted. The list of sorted phenotypes can be queried in any convenient manner. For example, the list can be traversed in order from first to last entry, comparing each sorted cell phenotype with a newly identified cell phenotype.

Some embodiments of the method of the present disclosure may record the phenotypes of cells sorted into partitions by adding representations of phenotypes of sorted cells to a probabilistic data structure. By probabilistic data structure, it is meant, for example, a data structure that, in some cases, is only capable of returning probabilistic and not definitive information about the properties, such as the contents, of the data structure. For example, in response to querying whether an element is a member of a set represented by a probabilistic data structure, the probabilistic data structure may be capable of indicating only that the element is possibly contained in the set or definitely not in the set. In some embodiments, the probabilistic data structure may be a Bloom filter. The Bloom filter may be any convenient size, and, in some cases, the size of the Bloom filter may be determined based, in part, on size and accuracy constraints. In some embodiments, the hash functions for the Bloom filter may be selected to reduce collisions in the Bloom filter based on an analysis of the sample. By collisions in the Bloom filter, it is meant that different cell phenotypes map to the same entry or entries in the Bloom filter. Such conditions may potentially lead to inaccurate results, such as false positives, from the Bloom filter. By selecting hash functions based on an analysis of the sample, it is meant selecting hash functions in order to reduce or minimize the possibility of different cell phenotypes being mapped into the same entry or entries of the Bloom filter.

In some embodiments, this method may further include querying the probabilistic data structure to determine whether or not a first cell has already been sorted, wherein the first cell has a phenotype also exhibited by a second cell. By querying the probabilistic data structure, it is meant that the data structure is accessed to determine whether it contains an identified phenotype. For instance, in the case of a Bloom filter, a representation of the identified phenotype is used, for example by hashing it, to access the contents of the Bloom filter to determine whether such phenotype has already been sorted. In some instances, the probabilistic data structure may only be capable of indicating whether the phenotype has likely already been sorted. In some cases, an implication of the probabilistic data structure indicating it includes such phenotype is that a first cell with such phenotype has already been sorted.

Some embodiments of the method of the present disclosure may record the phenotypes of cells sorted into partitions by adding representations of phenotypes of sorted cells to an associative array. By associative array, it is meant a data structure comprising a collection of key-value pairs. In some instances, the associative array may be comprised of, for example, a hash table or a search tree, such as a binary search tree, or an array. In some embodiments, the associative array is a content addressable memory. By a content addressable memory, it is meant a piece of hardware technology, such as a semiconductor implementation, capable of comparing an input search term against the contents of the content addressable memory and returning confirmation of whether the search term is stored in the content addressable memory.

In some embodiments, this method may further include querying the associative array to determine whether or not a first cell has already been sorted, wherein the first cell has a phenotype also exhibited by a second cell. By querying the associative array, it is meant accessing the associative array by looking up an identified phenotype in the associative array to determine whether it contains the identified phenotype. For instance, when the associative array is comprised of a search tree, such search tree may be searched to determine whether it includes the identified phenotype. In some cases, an implication of the associative array indicating it includes such phenotype is that a first cell with such phenotype has already been sorted.

Some embodiments of the method of the present disclosure may record the phenotypes of cells sorted into partitions by setting a value at a location in a truth table corresponding to a cell phenotype. By truth table, it is meant an array-like structure or table that is accessed by representations of cell phenotypes and with Boolean values corresponding to each row of the table. For example, when a cell phenotype is represented as a binary bit string, such bit string may be used to access a row in the truth table. Upon accessing a row, the truth table, which contains a Boolean value, such as true or false, corresponding to such row of the trust table, returns the Boolean value associated with such row. In some instances, a "true" value at a row of the truth table may be defined to mean that the cell phenotype used to access that row has already been sorted, and a "false" value means it has not already been sorted. In some instances, upon sorting a cell with a particular phenotype, the corresponding entry in the truth table may then be set to "true" to indicate that a cell with such phenotype has been sorted.

In some embodiments, this method may further include querying the truth table to determine whether or not a first cell has already been sorted, wherein the first cell has a phenotype also exhibited by a second cell. By querying the truth table, it is meant using a representation of the cell phenotype, such as, for example, a binary string, to access a corresponding row in the truth table to determine whether the value associated with that row of the truth table indicates the identified phenotype has already been sorted. In some cases, an implication of the truth table indicating the phenotype has been sorted is that a first cell with such phenotype has already been sorted.

In some embodiments, the methods of the present disclosure further comprise recording information identifying a partition and a phenotype of a cell sorted into the partition. For example, in some instances, the method may comprise maintaining a list identifying partitions and phenotypes of cells sorted into the partitions. In instances, a cell phenotype may be summarized in a representation that is distinct and distinguishable from representations of other possible cell phenotypes capable of being identified and, similarly, the partition into which a cell phenotype is sorted may be summarized in a representation that is distinct and distinguishable from other partitions into which cells are sorted. For example, cell phenotypes may be represented, in some cases, in the form of a bit string where each bit position of the bit string represents the presence or absence of a measurable feature (i.e., a constituent characteristic) of the cell phenotype such that the collection of measurable features (i.e., constituent characteristics) of the cell phenotype, together, is capable of representing distinguishable cell phenotypes. Similarly, information identifying a partition may be a summary of the position of the partition. For example, in instances when the partition comprises a well of a multi-well plate, information identifying the partition may include, for example, the position of the well on the multi-well plate, such as horizontal and vertical coordinates, as well as, in some cases, information identifying one multi-well plate among several multi-well plates. By maintaining a list of cell phenotypes and corresponding partitions, it is meant that representations of cell phenotypes and representations of corresponding partition identifying information may be stored in, for example, a data structure, such as an array, a linked list or a binary search tree. In instances where the list of cell phenotypes and corresponding partitions is maintained in the form of an array, each array entry may comprise a representation of a cell phenotype and a partition. In instances where the list of cell phenotypes and corresponding partitions is maintained in the form of a linked list, each linked list node may comprise a representation of a cell phenotype and a partition. In instances where the list of cell phenotypes and corresponding partitions is maintained in the form of a binary search tree, each tree node may comprise a representation of a cell phenotype and a partition.

In some embodiments, the method of the present disclosure further comprises estimating, based on a subset of cells in the sample, a number of phenotypes exhibited by cells in the sample. By a subset of cells in the sample, it is meant any convenient amount of the sample containing cells that may be needed for produce such an estimate. In some cases, as small an amount of the sample as possible is used to estimate the number of phenotypes of cells in the sample. By a number of phenotypes exhibited by cells in the sample, it is meant the number of different and distinct variations of cell phenotypes capable of identification that are present in the sample. In some instances, it may be beneficial to estimate in advance the number of different cell phenotypes exhibited by cells comprising a sample in order to more efficiently sort the sample or to insure a sufficient number of partitions are available to store sorted cells or to more efficiently record the cell phenotypes sorted.

The number of phenotypes exhibited by cells in the sample may be estimated using any convenient cardinality estimation algorithm, including, for example, probabilistic counting algorithms. In some embodiments, the Flajolet-Martin algorithm may be used to estimate the number of distinct phenotypes in a sample based on a subset of cells in the sample. In other embodiments, refinements of the Flajolet-Martin algorithm may be used, such as, for example, the HyperLogLog or the HyperLogLog++ algorithms. In some instances, the estimate of the number of distinct phenotypes in a sample may be computed based on aggregating a plurality of results computed from the application of one or more cardinality estimation algorithms. In such cases, the estimate of the number of distinct phenotypes in a sample may be, for example, an average, of the results of the plurality of estimates computed by the one or more cardinality estimation algorithms.

In some embodiments of the present invention, sorting cells comprises deflecting cells into a first partition and a second partition. By deflecting cells, it is meant directing sorted cells by means of, for example, an electrostatic deflector of a cell sorter, as described herein, into one of either a first partition or a second partition. In these methods, in some cases, the cells in the sample may be divided into a first group that exhibits a first collection of phenotypes, comprising a predetermined number of phenotypes, and a second group that does not exhibit the first collection of phenotypes. Further, these methods may also comprise that the first group is sorted into one of the first partition or the second partition, based on order of identification. In such instances, sorting a sample according to such method results in either the first or the second partition comprising cells exhibiting phenotypes belonging to the first collection of phenotypes and, in contrast, the other partition comprising cells exhibiting phenotypes that do not belong to the first collection of phenotypes. In instances, the first collection of phenotypes may comprise one or more identifiable cell phenotypes, such as a single cell phenotype or two cell phenotypes or ten cell phenotypes or 100 cell phenotypes or more. By sorting based on order of identification, it is meant that a cell sorted into the first partition may be either a member of the first group or the second group of cell phenotypes, depending on the order in which cells belonging to either the first group or the second group appear in the flow stream. In certain instances, the first collection of phenotypes used to divide cells into a first group and a second group is determined so that the first group and the second group comprise substantially the same number of cells. By comprising substantially the same number of cells, it is meant that upon completion of sorting, both the first partition and the second partition contain substantially the same number of cells, such that cells to be sorted in the sample are divided substantially equally between the first and second partitions. In some instances, this method further comprises dynamically updating the first collection of phenotypes based on sorted cells in the sample so that the first group and the second group comprise substantially the same number of cells. For instance, if, after commencing sorting, it is determined that the first partition in which cells belonging to the first collection of phenotypes are sorted is accruing substantially more or less cells than the second partition, then the phenotypes comprising the first collection of phenotypes may be adjusted to address the different number of cells in each of the first and second partitions.

In some instances, plate sorting a single well at a time is not as efficient as sorting two wells at a time by having two distinct deflections and then sorting pairs of wells, for example, sorting wells labeled A1 and A2, followed by wells A3 and A4. In such embodiments, it may be advantageous for sorting to both well deflections to be probabilistically balanced so that both deflections are likely to achieve a sort within a similar time window. In such embodiments, the phenotypes to be sorted into wells may be partitioned into two partitions where both partitions have a high probability of one of the constituent phenotypes being sorted. For example, a hypothetical sample may comprise sorting with Red—30%, Blue—25%, Green—20%, Yellow—15% and Violet—10%. In such hypothetical sample, Red plus Green would comprise 50%, Blue plus Yellow plus Violet would comprise 50%. In this example, since Red and Blue are the most likely occurrences, they may be assigned to different partitions. If Red and Blue are sorted into the first two wells then the likely next two partitions would be Green (20%), and Yellow plus Violet (25%). Other means of partitioning a sample may be applied. For example, in some instances, refinements of partitioning based on limited decision-making resources may be applied (e.g., the partition could split based on positive or negative of some property of the cell) that enables the best use of finite resources, such as finite resources in an implementation.

In certain embodiments, assigning partitions might be done with a method similar to that employed with Huffman coding. In other embodiments, assigning partitions might be done using other approaches, such as arithmetic coding. In other embodiments, still other approaches may be applied, for example approaches that take into consideration underlying resource limitations, such as, for example, hardware or software limitations.

In some embodiments, for each pair of wells to be sorted, the first phenotype identified is sorted into the first well, after which that phenotype is exclusively selected for the first well, and that phenotype is excluded from sorting into the second and subsequent wells. In other embodiments, the target phenotypes may be partitioned by balancing the partitions based on frequency-of-occurrence.

Still other embodiments may sort partitions into more than two wells.

In cases in which one partition was sorted but the other partition was taking an appreciable time and had not yet been sorted into, some embodiments may pause the sort temporarily after a predetermined timeout period, move the plate so that a new well is accessible to the stream deflection, and re-update the frequency partitioning. The predetermined timeout period may be set to any convenient amount of time. In some instances, the predetermined timeout period may be based on the observed frequency of phenotypes in a sample and an expected time to sort such phenotypes. Embodiments may, for example, proceed such that well A1 is sorted first, after which well A2 would be sorted; if A1 were taking an appreciable time and had not yet been sorted into, the sort may be paused and the plate moved so that wells A2 and A3 are the target wells, and the phenotype sorted into well A1 would now be excluded from sorting. Still other embodiments with a plurality of deflections may be applied to a scenario where wells A1 and A2 are current wells; A2 sorts first, but the sorting process cannot move because well A1 is still to sort, and well A3 may then be enabled to sort.

In embodiments, methods include identifying cell phenotypes based on one or more values of parameters that are determined from the data signals generated from the detected light. In some embodiments determining one or more parameters of the cell includes resolving light from a plurality of fluorophores in the sample, such as resolving light detected from fluorophores having overlapping fluorescence. In some embodiments, determining parameters of cells in the flow stream includes calculating a spectral unmixing matrix for the fluorescence from the sample. In some instances, certain values of a parameter of a cell indicate an indeterminate state of whether the cell has a phenotype. By indeterminate state of whether a cell has a phenotype, it is meant that it can neither be ruled in nor can it be ruled out whether a cell exhibits a particular phenotype or characteristic. In some instances, the boundaries of parameter values corresponding to distinguishing whether a cell exhibits a particular phenotype from a cell that does not exhibit such phenotype are ambiguous. In such instances, certain parameter values may correspond to an indeterminate state of whether the sorted cell exhibits a particular phenotype. These methods may further comprise not sorting a cell when it exhibits an indeterminate state of whether the cell has a phenotype. By not sorting such a cell, it is meant that the cell is not directed to a partition and instead may be discarded, such as, for example, directed to the waste container of the cell sorter.

Figure 6:
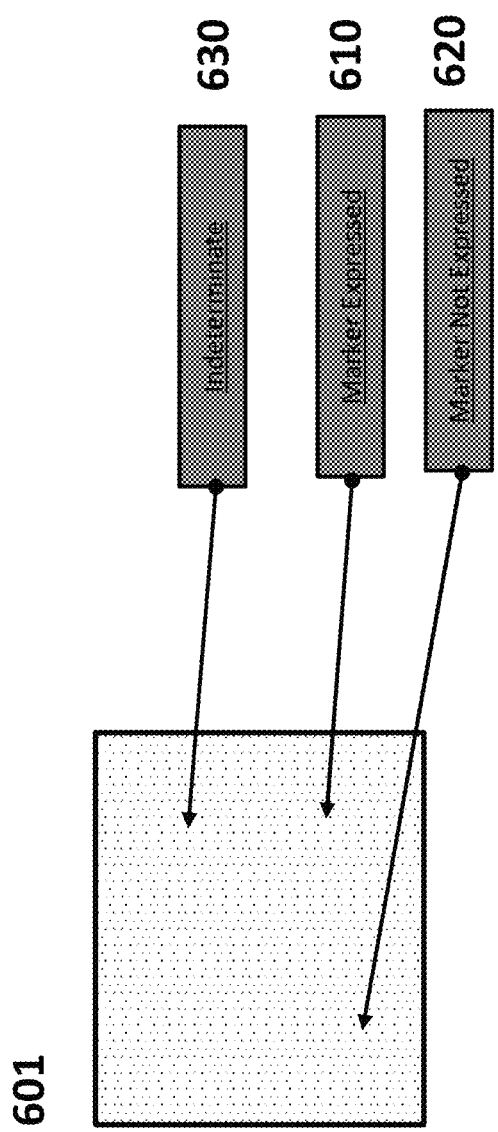
FIG. 6 depicts an illustration of phenotype identification classifications, including an indeterminate phenotype classification.

FIG. 6 depicts a plot 601 of at least two parameter values based on data signals generated from light detected from cells of the sample, wherein, for example, the value of one parameter may be plotted on the horizontal axis and the value of another parameter may be plotted on the vertical axis. In this case a determination of whether a cell exhibits a phenotype and in particular, a marker corresponding to an aspect of a cell phenotype, may be determined based on the position of a point on the plot where the point corresponds to parameter values of the cell. The area on plot 601 proximate to area 610 corresponds to an affirmative determination that a marker is expressed in a cell and that the cell has a phenotype comprising the marker of interest, i.e., that a constituent characteristic of a cell phenotype is present. The area on plot 601 proximate to area 620 corresponds to an affirmative determination that the same marker is not expressed in a cell and that the cell has a phenotype that does not comprise the marker of interest, i.e., that the constituent characteristic of a cell phenotype is not present. The area on plot 601 proximate to area 630 corresponds to an indeterminate determination of whether the marker is expressed or not in a cell, i.e., it is indeterminate whether or not the constituent characteristic of a cell phenotype is present or not.

Some embodiments may further comprise estimating an amount of fluorescent spillover measured with respect to a single data signal based on a predicted variance-covariance matrix of unmixed data for a sorted cell. In some instances, such method may further comprise estimating a covariance between two fluorophores based on the predicted variance-covariance matrix of unmixed data for the sorted cell. Some embodiments of such method further comprise defining thresholds for expression for a fluorophore based on the estimated covariance between fluorophores. Some embodiments of such method further comprise defining a measure of uncertainty with respect to the phenotype exhibited by a sorted cell based on the estimated covariance between fluorophores.

In some embodiments of the method of the present disclosure, the collection of predetermined phenotypes comprises a cell type with one or more cell subtypes. By cell types, it is meant a classification of cells used to distinguish between morphologically or phenotypically distinct cell forms within a species. In instances, the cell type may be T cell. In such methods, the cell subtypes may include, for example, CD4+ T cells or CD8+ T cells.

Figure 7:
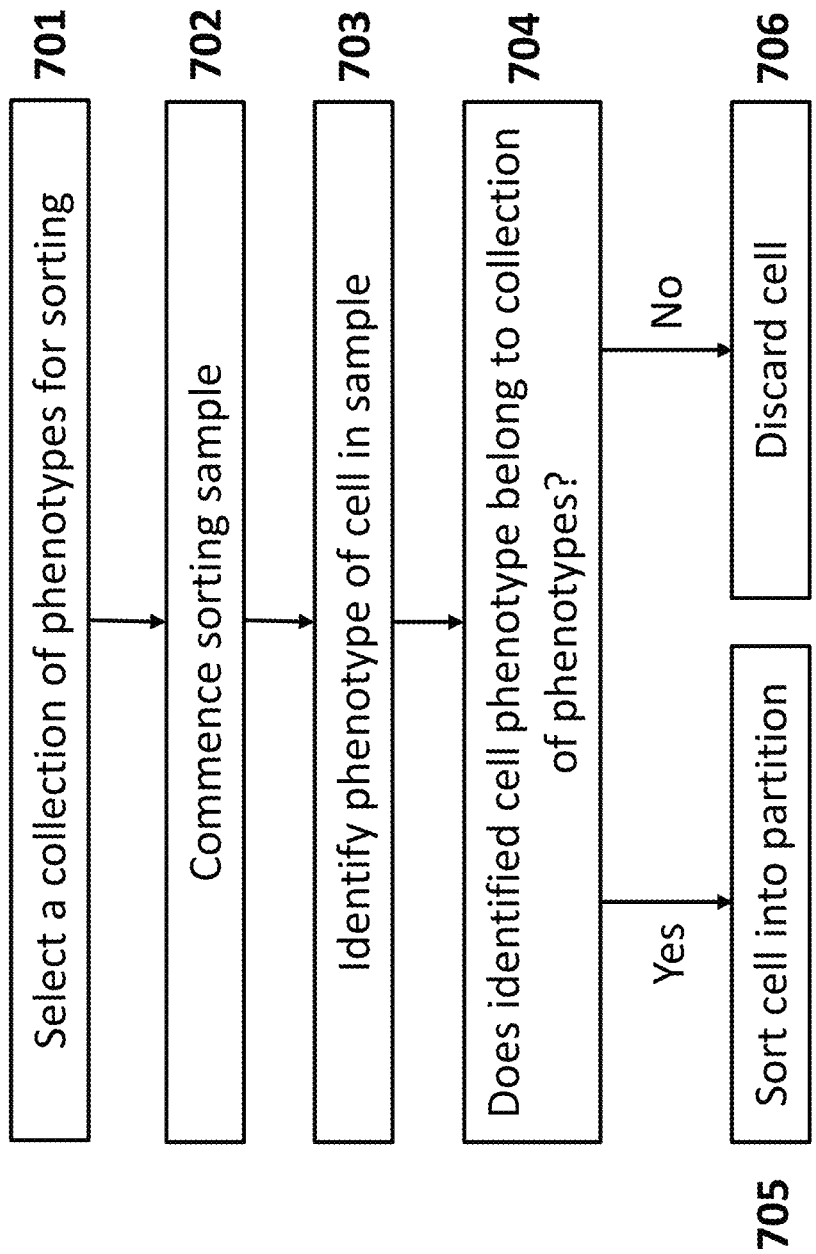
FIG. 7 depicts a flow diagram for sorting a sample according to certain embodiments of the present disclosure.

FIG. 7 depicts a flow diagram for sorting a sample according to certain embodiments of the present disclosure. At step 701, a collection of cell phenotypes is selected. That is, one or more cell phenotypes are designated as belonging to a predetermined collection of phenotypes, meaning cells of the sample with phenotypes belonging to the predetermined collection of phenotypes will be sorted if present in the sample. At step 702, sorting is commenced. When sorting is commenced, a sample may be flowed in a flow stream of a flow cytometer. The sample may be irradiated, and light may be detected from cells in the sample flowing in the flow stream. Based on such light detected from cells in the flow stream, a phenotype of the cell is identified at step 703. At step 704, it is determined whether the identified cell phenotype belongs to the predetermined collection of phenotypes selected in step 701. In the event the identified cell phenotype belongs to the predetermined collection of phenotypes, the process proceeds to step 705 and the cell is sorted into a partition. If, in the alternative, the identified cell phenotype does not belong to the predetermined collection of phenotypes, the process proceeds to step 706 and the cell is not sorted into a partition; it is discarded.

In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference. In certain embodiments, cells of the sample are sorted using a sort decision module having a plurality of sort decision units, such as those described in U.S. Provisional Patent Application No. 62/803,264, filed on Feb. 8, 2019, the disclosure of which is incorporated herein by reference.

Systems for Flow Cytometrically Sorting a Sample with Particles, Such as Cells, Based on Order of Identification As summarized above, aspects of the present disclosure include a system that is configured to flow cytometrically sort a sample with particles, such as cells, based on order of identification. In particular, the present disclosure includes systems configured to dynamically sort into partitions particles, such as cells, of the sample that have a phenotype of a collection of predetermined phenotypes based on order of identification. As described above, the phrase "dynamically sorting based on order of identification" is used to refer to sorting particles, such as cells, of interest in the order in which such cells appear in, for example, a flow stream. That is, particles, such as cells, of interest are sorted as and when they appear in, for example, a flow stream during sorting. Systems according to certain embodiments include a light source configured to irradiate a sample comprising cells flowing in a flow stream, a light detection system having a photodetector that detects light from the cells in the sample and generates a plurality of data signals from the detected light, a cell sorter configured to receive the sample comprising cells flowing in the flow stream, a plurality of partitions configured to receive cells from the sample sorted by the cell sorter and a processor having memory operably coupled to the processor where the memory includes instructions stored thereon which when executed by the processor cause the processor to identify phenotypes of cells in the sample based on one or more of the data signals generated from the detected light and instruct the cell sorter to dynamically sort into the partitions cells of the sample that have a phenotype of a collection of predetermined phenotypes based on order of identification.

In embodiments, the light source may be any suitable broadband or narrow band source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm. In certain embodiments, the light source is a laser. In some instances, the subject systems include a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O (BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, a multi-LED integrated light source. In some instances, the non-laser light source is a stabilized fiber-coupled broadband light source, white light source, among other light sources or any combination thereof.

The light source may be positioned any suitable distance from the sample (e.g., the flow stream in a flow cytometer), such as at a distance of 0.001 mm or more from the flow stream, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may irradiate the sample at any suitable angle (e.g., relative the vertical axis of the flow stream), such as at an angle ranging from 10° to 90°, such as from 15° to 85°, such as from 20° to 80°, such as from 25° to 75° and including from 30° to 60°, for example at a 90° angle. The light source may be configured to irradiate the sample continuously or in discrete intervals. In some instances, systems include a light source that is configured to irradiate the sample continuously, such as with a continuous wave laser that continuously irradiates the flow stream at the interrogation point in a flow cytometer. In other instances, systems of interest include a light source that is configured to irradiate the sample at discrete intervals, such as every 0.001 milliseconds, every 0.01 milliseconds, every 0.1 milliseconds, every 1 millisecond, every 10 milliseconds, every 100 milliseconds and including every 1000 milliseconds, or some other interval. Where the light source is configured to irradiate the sample at discrete intervals, systems may include one or more additional components to provide for intermittent irradiation of the sample with the light source. For example, the subject systems in these embodiments may include one or more laser beam choppers, manually or computer controlled beam stops for blocking and exposing the sample to the light source.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled or frequency tripled implementation of any of the above mentioned lasers.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser, such as described above.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to about 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory that may include instructions to produce 100 or more angularly deflected laser beams with the same intensities. In other embodiments, the memory may include instructions to produce two or more angularly deflected laser beams with different intensities, such as 3 or more, such as 4 or more, such as 5 or more, such as 10 or more, such as 25 or more, such as 50 or more and including memory that may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having a one or more photodetectors. Photodetectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors.

In some embodiments, light detection systems of interest include a plurality of photodetectors. In some instances, the light detection system includes a plurality of solid-state detectors such as photodiodes. In certain instances, the light detection system includes a photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, photodetectors are configured to measure collected light over a range of wavelengths (e.g., 200 nm-1000 nm). In certain embodiments, photodetectors of interest are configured to collect spectra of light over a range of wavelengths. For example, systems may include one or more detectors configured to collect spectra of light over one or more of the wavelength ranges of 200 nm-1000 nm. In yet other embodiments, detectors of interest are configured to measure light from the sample in the flow stream at one or more specific wavelengths. For example, systems may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, photodetectors may be configured to be paired with specific fluorophores, such as those used with the sample in a fluorescence assay. In some embodiments, photodetectors are configured to measure collected light across the entire fluorescence spectrum of each fluorophore in the sample.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In embodiments, systems include a cell sorter configured to receive the sample comprising cells flowing in the flow stream. By cell sorter, it is meant any convenient module for sorting particles, such as cells, from the flow stream, as described below. As described below, the term "sorting" is used herein in its conventional sense to refer to separating components (e.g., cells, non-cellular particles such as biological macromolecules) of the sample and in some instances delivering the separated components to one or more partitions, such as sample collection containers.

In embodiments, systems include a plurality of partitions configured to receive cells from the sample sorted by the cell sorter. By partition, it is meant any convenient container, such as a sample collection container, capable of receiving one or more particles, such as a cell, sorted by the cell sorter and maintaining the contents of the partition separate and isolated from other materials not sorted into the partition. Embodiments include more than one partition, such as two partitions, four partitions, 96 partitions or 1536 or more partitions. Partitions may be any convenient size that is capable of receiving and maintaining particles, such as cells, isolated from the sample of the flow stream. In some cases, partitions are sized to hold more than one cell, such as 10 cells, 100 cells, 1000 cells, 10000 cells or more. In some embodiments, partitions comprise wells. In instances, wells may be small test tubes. Wells may be any convenient shape. In some instances, the shape of the lateral cross section of wells is circular; in other cases, it is rectangular or square. Wells may be any size with sufficient capacity for holding particles, such as cells, as needed. For example, the volume of a well may be 0.001 mL or greater, such as 0.005 mL or 0.015 mL or 0.1 mL or 2 mL or 5 mL or greater. In some embodiments, wells may be wells of a multi-well plate. A multi-well plate may include any number of wells. In instances, a multi-well plate may include six or 12 or 24 or 48 or 96 or 384 or 1536 or 3456 or 9600 or more wells. Wells of a multi-well plate may be arranged in any convenient pattern. In some instances, wells are arranged in a rectangular shape with a length to width ration of approximately two to three. In some instances, multi-well plates of the present disclosure may conform to accepted standards such as a standard established by the Society for Biomolecular Sciences with the ANSI-Standards. Multi-well plates may be composed of any convenient material. In some cases, multi-well plates may be composed of polypropylene, polystyrene or polycarbonate. In these embodiments, the multi-well plate may be advanced to a second well after sorting a predetermined number of cells into a first well. The predetermined number of cells may be one cell, two cells, ten cells or 100 cells or more.

Systems of the present disclosure are configured to flow cytometrically sort a sample with particles, such as cells. In embodiments, systems are configured to identify phenotypes of cells in the sample based on one or more data signals generated from detected light. Light detection systems are configured to generate a plurality of data signals from the light detected from particles, such as cells, in the sample. The data signals generated may be analog data signals or digital data signals. Where the data signals are analog data signals, in some instances, systems further include an analog-to-digital converter configured to convert the analog data signals to digital data signals. Systems of interest include a processor having memory operably coupled to the processor where the memory includes instructions stored thereon which when executed by the processor cause the processor to identify phenotypes of cells in the sample based on one or more of the data signals generated from detected light. In some instances, identifying a cell phenotype includes assigning the cell to a cell population cluster. In other instances, identifying a cell phenotype includes plotting one or more data signals generated from detected light of the cell onto a scatter plot. In certain instances, identifying cell phenotypes in the sample includes generating a two-dimensional bitmap having a region of interest (ROI) and determining whether a particle should be assigned to the ROI of the bitmap. In systems of the present disclosure memory also includes instructions stored thereon which when executed by the processor cause the processor to instruct the cell sorter to dynamically sort into the partitions cells of the sample that have a phenotype of a collection of predetermined phenotypes based on order of identification. As described above, by "sorting based on order of identification," it is meant, for example, sorting cells in the order in which such cells appear in the flow stream. By sorting cells with phenotypes belonging to a predetermined collection of phenotypes, it is meant that, for example, in some embodiments, instructions stored on the memory, when executed by the processor, cause the processor to compare an identified cell phenotype with the one or more predetermined cell phenotypes of the predetermined collection of cell phenotypes, generating a true or false result indicating whether the identified cell phenotype is identical to the one or more phenotypes belonging to the predetermined collection of phenotypes. By "instructing the cell sorter," it is meant that the processor causes the cell sorter to sort a cell, the phenotype of which has been identified. The processor may instruct the cell sorter by any convenient means, for example, in some embodiments by conveying electrical signals encoding a sort instruction via an operable connection between the processor and the cell sorter. Such an operable connection may be a wired or wireless connection.

In some embodiments, the memory includes instructions stored thereon, which, when executed by the processor, cause the processor to instruct the cell sorter to stop sorting a first phenotype from the collection of phenotypes after a predetermined number of cells that have the first phenotype are sorted. By stop sorting cells that have a first phenotype, it is meant that upon execution of such instructions by the processor, in some embodiments, when a cell is identified as having a first phenotype, the processor instructs the cell sorter not to sort such cell. In some instances, instructing the cell sorter not to sort a cell may be accomplished by omitting to issue an affirmative sort instruction. In some embodiments, the memory includes instructions stored thereon, which, when executed by the processor, cause the processor to instruct the cell sorter to dynamically sort a predetermined number of cells into a partition. In some instances, the predetermined number of cells may be one cell, two cells, ten cells, 100 cells or more. For example, the predetermined number of cells may be one.

In some embodiments, the system further comprises a translatable support stage configured to move the multi-well plate, and the processor comprises memory operably coupled to the processor, wherein the memory comprises instructions stored thereon, which, when executed by the processor, cause the processor to instruct the support stage to move the multi-well plate to a second well after sorting a predetermined number of cells into a first well. By translatable support stage, it is meant any convenient stage capable of receiving a multi-well plate. Any convenient displacement protocol may be employed to translate the support stage, such as moving the support stage with a motor actuated translation stage, leadscrew translation assembly, geared translation device, such as those employing a stepper motor, servo motor, brushless electric motor, brushed DC motor, micro-step drive motor, high resolution stepper motor, among other types of motors.

In embodiments, the memory includes instructions stored thereon which when executed by the processor cause the processor to store the phenotypes of cells sorted into partitions. By store phenotypes of sorted cells, it is meant that summary representations of cell phenotypes in any convenient data format are added to a memory, which in some cases may be a dedicated hardware memory. In embodiments, the memory includes instructions stored thereon which when executed by the processor cause the processor to store the phenotypes of cells sorted into partitions by adding representations of phenotypes of sorted cells to a list of phenotypes. In some cases, by list of phenotypes, it is meant, for example, an array allocated in memory capable of receiving summary representations of cell phenotypes. In other cases, it is meant a linked list data structure in memory capable of receiving summary representations of cell phenotypes. In some instances, the linked list may be sorted. In other cases, it is meant a binary tree data structure allocated in memory, capable of receiving summary representations of cell phenotypes. In these embodiments, the memory may comprise instructions stored thereon, which, when executed by the processor, cause the processor to query the list of phenotypes to determine whether or not a first cell has already been sorted, wherein the first cell has a phenotype also exhibited by a second cell. Any convenient search and comparison routines or algorithms may be employed to determine whether or not a cell phenotype is already represented in the list of phenotypes and thus has already been sorted.

In embodiments, the memory includes instructions stored thereon which when executed by the processor cause the processor to store the phenotypes of cells sorted into partitions by adding representations of phenotypes of sorted cells to a probabilistic data structure. As described above, a probabilistic data structure is a data structure that, in some cases, may be capable of returning only probabilistic and not definitive information about the properties of the data structure, such as whether the data structure includes a query term, such as a representation of a cell phenotype. In these embodiments, the memory may comprise instructions stored thereon, which, when executed by the processor, cause the processor to query the probabilistic data structure to determine whether or not a first cell has already been sorted, wherein the first cell has a phenotype also exhibited by a second cell. In some cases, by querying the probabilistic data structure, the probabilistic data structure may be capable of indicating only a probabilistic result, such as a cell phenotype has likely, but has not definitively, already been sorted. In some cases, the probabilistic data structure is a Bloom filter, as described above.

In embodiments, the memory includes instructions stored thereon which when executed by the processor cause the processor to store the phenotypes of cells sorted into partitions by adding representations of phenotypes of sorted cells to an associative array, as described above. In these embodiments, the memory may comprise instructions stored thereon, which, when executed by the processor, cause the processor to query the associative array to determine whether or not a first cell has already been sorted, wherein the first cell has a phenotype also exhibited by a second cell. In some cases, the associative array is a content addressable memory. Any convenient hardware or software search and comparison routines and algorithms may be employed to query the associative array to determine whether or not a first cell has already been sorted.

In embodiments, the memory includes instructions stored thereon which when executed by the processor cause the processor to store the phenotypes of cells sorted into partitions by setting a value at a location in a truth table corresponding to a cell phenotype. In instances, the truth table may comprise a dedicated hardware module. In these embodiments, the memory may comprise instructions stored thereon, which, when executed by the processor, cause the processor to query the truth table to determine whether or not a first cell has already been sorted, wherein the first cell has a phenotype also exhibited by a second cell. The contents of the truth table may be Boolean values, each represented by one or more bits.

In embodiments, the memory includes instructions stored thereon which when executed by the processor cause the processor to store information identifying a partition and a phenotype of a cell sorted into the partition. As described above, any convenient summary identification of the location of a partition, such as, in some cases, the horizontal and vertical coordinates of a well in a multi-well plate, may be employed to identify a partition. In instances, a cell phenotype may be represented as a bit string in which each bit of the bit string corresponds to the presence or absence of a constituent characteristic of a cell phenotype. In these embodiments, the memory may comprise instructions stored thereon, which, when executed by the processor, cause the processor to maintain a list identifying partitions and phenotypes of cells sorted into the partitions. The list may take any convenient form, such as an array, a linked list, or a binary search tree. Representations of partitions and phenotypes of cells may take the form of, for example, bit strings, and may be stored in memory, including in a dedicated memory module.

In embodiments, the memory includes instructions stored thereon which when executed by the processor cause the processor to instruct the cell sorter to: dynamically sort into a first partition cells of the sample that exhibit a first collection of phenotypes, comprising one or more phenotypes, based on order of identification, and dynamically sort into a second partition cells of the sample that do not exhibit the first collection of phenotypes. In these embodiments, the memory may comprise instructions stored thereon, which, when executed by the processor, cause the processor to dynamically update the first collection of phenotypes based on sorted cells in the sample so that cells sorted into the first partition and cells sorted into the second partition comprise substantially the same number of cells.

In embodiments, the memory includes instructions stored thereon which when executed by the processor cause the processor to determine one or more parameters of a particle in the flow stream from the generated data signals. In embodiments, the memory includes instructions stored thereon which when executed by the processor cause the processor to not sort a cell exhibiting an indeterminate phenotype. By not sorting a cell, in some instances, it is meant that the processor omits sending a sort instruction to the cell sorter. By indeterminate phenotype, it is meant, as described above, a phenotype wherein a particular phenotype, or, in some cases, a constituent characteristic of a cell phenotype, can neither be definitively ruled in nor ruled out as present in a cell.

In embodiments, the memory includes instructions stored thereon which when executed by the processor cause the processor to calculate an estimate of an amount of fluorescent spillover measured with respect to a single data signal based on a predicted variance-covariance matrix of unmixed data for a sorted cell. In these embodiments, the memory may comprise instructions stored thereon, which, when executed by the processor, cause the processor to calculate an estimate of a covariance between two fluorophores based on the predicted variance-covariance matrix of unmixed data for the sorted cell. In these embodiments, the memory may comprise instructions stored thereon, which, when executed by the processor, cause the processor to calculate thresholds for expression for a fluorophore based on the estimated covariance between fluorophores. In these embodiments, the memory may comprise instructions stored thereon, which, when executed by the processor, cause the processor to calculate a measure of uncertainty with respect to the phenotype exhibited by a sorted cell based on the estimated covariance between fluorophores.

In some embodiments, systems of interest may include one or more sort decision modules configured to generate a sorting decision for the particle, such as the cell, based on identifying the phenotype of the cell and determining whether the cell phenotype belongs to the collection of predetermined phenotypes. As described above, systems further include a particle sorter, that is a cell sorter (e.g., having a droplet deflector), for sorting the particles, such as cells, from the flow stream based on the sort decision generated by the sort decision module. As described above, the term "sorting" is used herein in its conventional sense to refer to separating components (e.g., cells, non-cellular particles such as biological macromolecules) of the sample and in some instances delivering the separated components to one or more partitions, such as sample collection containers. For example, the subject systems may be configured for sorting samples having 2 or more components, such as 3 or more components, such as 4 or more components, such as 5 or more components, such as 10 or more components, such as 15 or more components and including sorting a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container. In some cases, the phrase "sample components" refers to cells with differing cell phenotypes.

In some embodiments, particle sorting systems of interest are configured to sort particles, such as cells, with an enclosed particle sorting module (i.e., cell sorter), such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Provisional Patent Application No. 62/803,264, filed on Feb. 8, 2019, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

FIG. 1 shows a functional block diagram for one example of a sorting control system, such as an analytics controller 100, for analyzing and displaying biological events. An analytics controller 100 can be configured to implement a variety of processes for controlling graphic display of biological events.

A particle analyzer or sorting system 102 can be configured to acquire biological event data. For example, a flow cytometer can generate flow cytometric event data. The particle analyzer 102 can be configured to provide biological event data to the analytics controller 100. A data communication channel can be included between the particle analyzer 102 and the analytics controller 100. The biological event data can be provided to the analytics controller 100 via the data communication channel.

The analytics controller 100 can be configured to receive biological event data from the particle analyzer 102. The biological event data received from the particle analyzer 102 can include flow cytometric event data. The analytics controller 100 can be configured to provide a graphical display including a first plot of biological event data to a display device 106. The analytics controller 100 can be further configured to render a region of interest as a gate around a population of biological event data shown by the display device 106, overlaid upon the first plot, for example. In some embodiments, the gate can be a logical combination of one or more graphical regions of interest drawn upon a single parameter histogram or bivariate plot. In some embodiments, the display can be used to display particle parameters.

The analytics controller 100 can be further configured to display the biological event data on the display device 106 within the gate differently from other events in the biological event data outside of the gate. For example, the analytics controller 100 can be configured to render the color of biological event data contained within the gate to be distinct from the color of biological event data outside of the gate. The display device 106 can be implemented as a monitor, a tablet computer, a smartphone, or other electronic device configured to present graphical interfaces.

The analytics controller 100 can be configured to receive a gate selection signal identifying the gate from a first input device. For example, the first input device can be implemented as a mouse 110. The mouse 110 can initiate a gate selection signal to the analytics controller 100 identifying the gate to be displayed on or manipulated via the display device 106 (e.g., by clicking on or in the desired gate when the cursor is positioned there). In some implementations, the first device can be implemented as the keyboard 108 or other means for providing an input signal to the analytics controller 100 such as a touchscreen, a stylus, an optical detector, or a voice recognition system. Some input devices can include multiple inputting functions. In such implementations, the inputting functions can each be considered an input device. For example, as shown in FIG. 1, the mouse 110 can include a right mouse button and a left mouse button, each of which can generate a triggering event.

The triggering event can cause the analytics controller 100 to alter the manner in which the data is displayed, which portions of the data is actually displayed on the display device 106, and/or provide input to further processing such as selection of a population of interest for particle sorting.

In some embodiments, the analytics controller 100 can be configured to detect when gate selection is initiated by the mouse 110. The analytics controller 100 can be further configured to automatically modify plot visualization to facilitate the gating process. The modification can be based on the specific distribution of biological event data received by the analytics controller 100.

The analytics controller 100 can be connected to a storage device 104. The storage device 104 can be configured to receive and store biological event data from the analytics controller 100. The storage device 104 can also be configured to receive and store flow cytometric event data from the analytics controller 100. The storage device 104 can be further configured to allow retrieval of biological event data, such as flow cytometric event data, by the analytics controller 100.

A display device 106 can be configured to receive display data from the analytics controller 100. The display data can comprise plots of biological event data and gates outlining sections of the plots. The display device 106 can be further configured to alter the information presented according to input received from the analytics controller 100 in conjunction with input from the particle analyzer 102, the storage device 104, the keyboard 108, and/or the mouse 110.

In some implementations the analytics controller 100 can generate a user interface to receive example events for sorting. For example, the user interface can include a control for receiving example events or example images. The example events or images or an example gate can be provided prior to collection of event data for a sample or based on an initial set of events for a portion of the sample.

FIG. 2A is a schematic drawing of a particle sorter system 200 (e.g., the particle analyzer 102) in accordance with one embodiment presented herein. In some embodiments, the particle sorter system 200 is a cell sorter system. As shown in FIG. 2A, a drop formation transducer 202 (e.g., piezo-oscillator) is coupled to a fluid conduit 201, which can be coupled to, can include, or can be, a nozzle 203. Within the fluid conduit 201, sheath fluid 204 hydrodynamically focuses a sample fluid 206 comprising particles 209 into a moving fluid column 208 (e.g., a stream). Within the moving fluid column 208, particles 209 (e.g., cells) are lined up in single file to cross a monitored area 211 (e.g., where laser-stream intersect), irradiated by an irradiation source 212 (e.g., a laser). Vibration of the drop formation transducer 202 causes moving fluid column 208 to break into a plurality of drops 210, some of which contain particles 209.

In operation, a detection station 214 (e.g., an event detector) identifies when a particle of interest (or cell of interest) crosses the monitored area 211. Detection station 214 feeds into a timing circuit 228, which in turn feeds into a flash charge circuit 230. At a drop break off point, informed by a timed drop delay ($\Delta t$), a flash charge can be applied to the moving fluid column 208 such that a drop of interest carries a charge. The drop of interest can include one or more particles or cells to be sorted. The charged drop can then be sorted by activating deflection plates (not shown) to deflect the drop into partitions, for example, a vessel such as a collection tube or a multi-well or microwell sample plate where a partition or a well or a microwell can be associated with drops of particular interest. As shown in FIG. 2A, the drops can be collected in a drain receptacle 238.

A detection system 216 (e.g., a drop boundary detector) serves to automatically determine the phase of a drop drive signal when a particle of interest passes the monitored area 211. An exemplary drop boundary detector is described in U.S. Pat. No. 7,679,039, which is incorporated herein by reference in its entirety. The detection system 216 allows the instrument to accurately calculate the place of each detected particle in a drop. The detection system 216 can feed into an amplitude signal 220 and/or phase 218 signal, which in turn feeds (via amplifier 222) into an amplitude control circuit 226 and/or frequency control circuit 224. The amplitude control circuit 226 and/or frequency control circuit 224, in turn, controls the drop formation transducer 202. The amplitude control circuit 226 and/or frequency control circuit 224 can be included in a control system.

In some implementations, sort electronics (e.g., the detection system 216, the detection station 214 and a processor 240) can be coupled with a memory configured to store the detected events and a sort decision based thereon. The sort decision can be included in the event data for a particle. In some implementations, the detection system 216 and the detection station 214 can be implemented as a single detection unit or communicatively coupled such that an event measurement can be collected by one of the detection system 216 or the detection station 214 and provided to the non-collecting element.

Figure 2B:
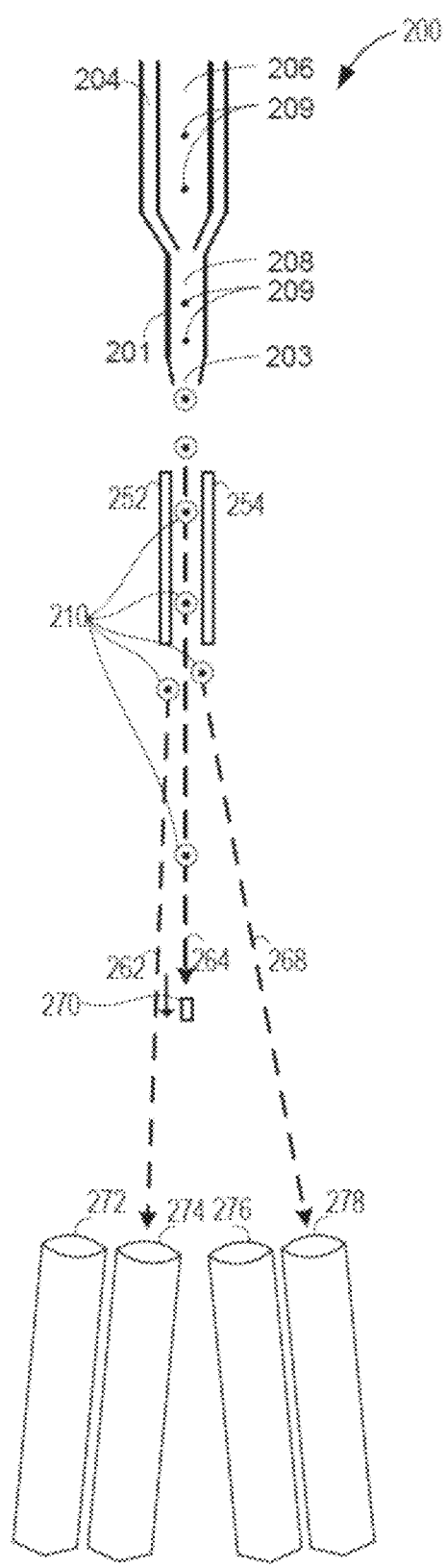
FIG. 2B depicts a schematic drawing of a particle sorter system according to certain embodiments.

FIG. 2B is a schematic drawing of a particle sorter system, in accordance with one embodiment presented herein. The particle sorter system 200 shown in FIG. 2B includes deflection plates 252 and 254. A charge can be applied via a stream-charging wire in a barb. This creates a stream of droplets 210 containing particles 210 for analysis. The particles can be illuminated with one or more light sources (e.g., lasers) to generate light scatter and fluorescence information. The information for a particle is analyzed such as by sorting electronics or other detection system (not shown in FIG. 2B). The deflection plates 252 and 254 can be independently controlled to attract or repel the charged droplet to guide the droplet toward a destination collection receptacle (e.g., one of 272, 274, 276, or 278), such as a partition. As shown in FIG. 2B, the deflection plates 252 and 254 can be controlled to direct a particle along a first path 262 toward the receptacle 274 or along a second path 268 toward the receptacle 278. If the particle is not of interest (e.g., does not exhibit scatter or illumination information within a specified sort range), deflection plates may allow the particle to continue along a flow path 264. Such uncharged droplets may pass into a waste receptacle such as via aspirator 270.

The sorting electronics can be included to initiate collection of measurements, receive fluorescence signals for particles, and determine how to adjust the deflection plates to cause sorting of the particles. Example implementations of the embodiment shown in FIG. 2B include the BD FACSAria™ line of flow cytometers commercially provided by Becton, Dickinson and Company (Franklin Lakes, N.J.).

In some embodiments, one or more components described for the particle sorter system 200 can be used to analyze and characterize particles, with or without physically sorting the particles into collection vessels. Likewise, one or more components described below for the particle analysis system 300 (FIG. 3) can be used to analyze and characterize particles, with or without physically sorting the particles into collection vessels. For example, particles can be grouped or displayed in a tree that includes at least three groups as described herein, using one or more of the components of the particle sorter system 200 or particle analysis system 300.

Figure 3:
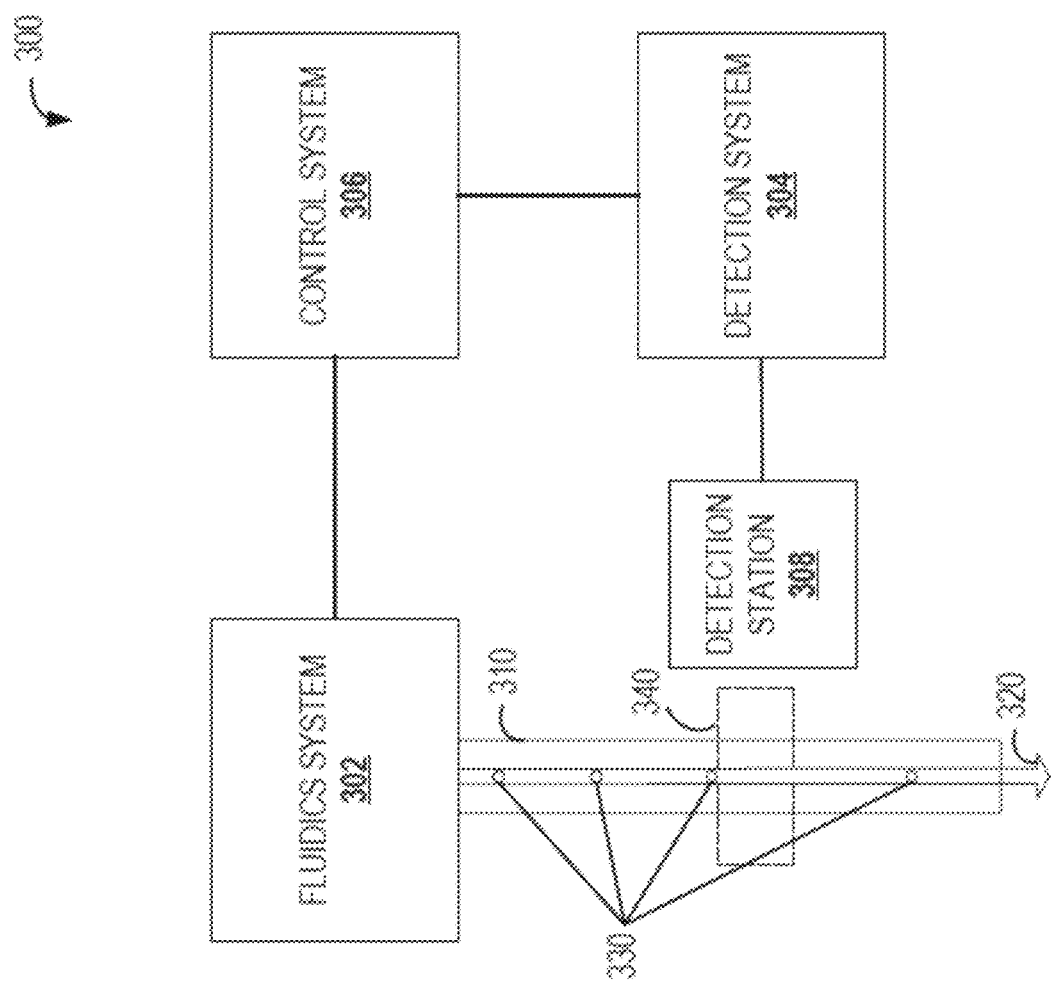
FIG. 3 depicts a functional block diagram of a particle analysis system for computational based sample analysis and particle characterization according to certain embodiments.

FIG. 3 shows a functional block diagram of a particle analysis system for computational based sample analysis and particle characterization. In some embodiments, the particle analysis system 300 is a flow system. The particle analysis system 300 shown in FIG. 3 can be configured to perform, in whole or in part, the methods described herein. The particle analysis system 300 includes a fluidics system 302. The fluidics system 302 can include or be coupled with a sample tube 310 and a moving fluid column within the sample tube in which particles 330 (e.g., cells) of a sample move along a common sample path 320.

The particle analysis system 300 includes a detection system 304 configured to collect a signal from each particle as it passes one or more detection stations along the common sample path. A detection station 308 generally refers to a monitored area 340 of the common sample path. Detection can, in some implementations, include detecting light or one or more other properties of the particles 330 as they pass through a monitored area 340. In FIG. 3, one detection station 308 with one monitored area 340 is shown. Some implementations of the particle analysis system 300 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 304 is configured to collect a succession of such data points in a first time interval.

The particle analysis system 300 can also include a control system 306. The control system 306 can include one or more processors, an amplitude control circuit 226 and/or a frequency control circuit 224 as shown in FIG. 2A. The control system 206 shown can be operationally associated with the fluidics system 302. The control system 306 can be configured to generate a calculated signal frequency for at least a portion of the first time interval based on a Poisson distribution and the number of data points collected by the detection system 304 during the first time interval. The control system 306 can be further configured to generate an experimental signal frequency based on the number of data points in the portion of the first time interval. The control system 306 can additionally compare the experimental signal frequency with that of a calculated signal frequency or a predetermined signal frequency.

Figure 4:
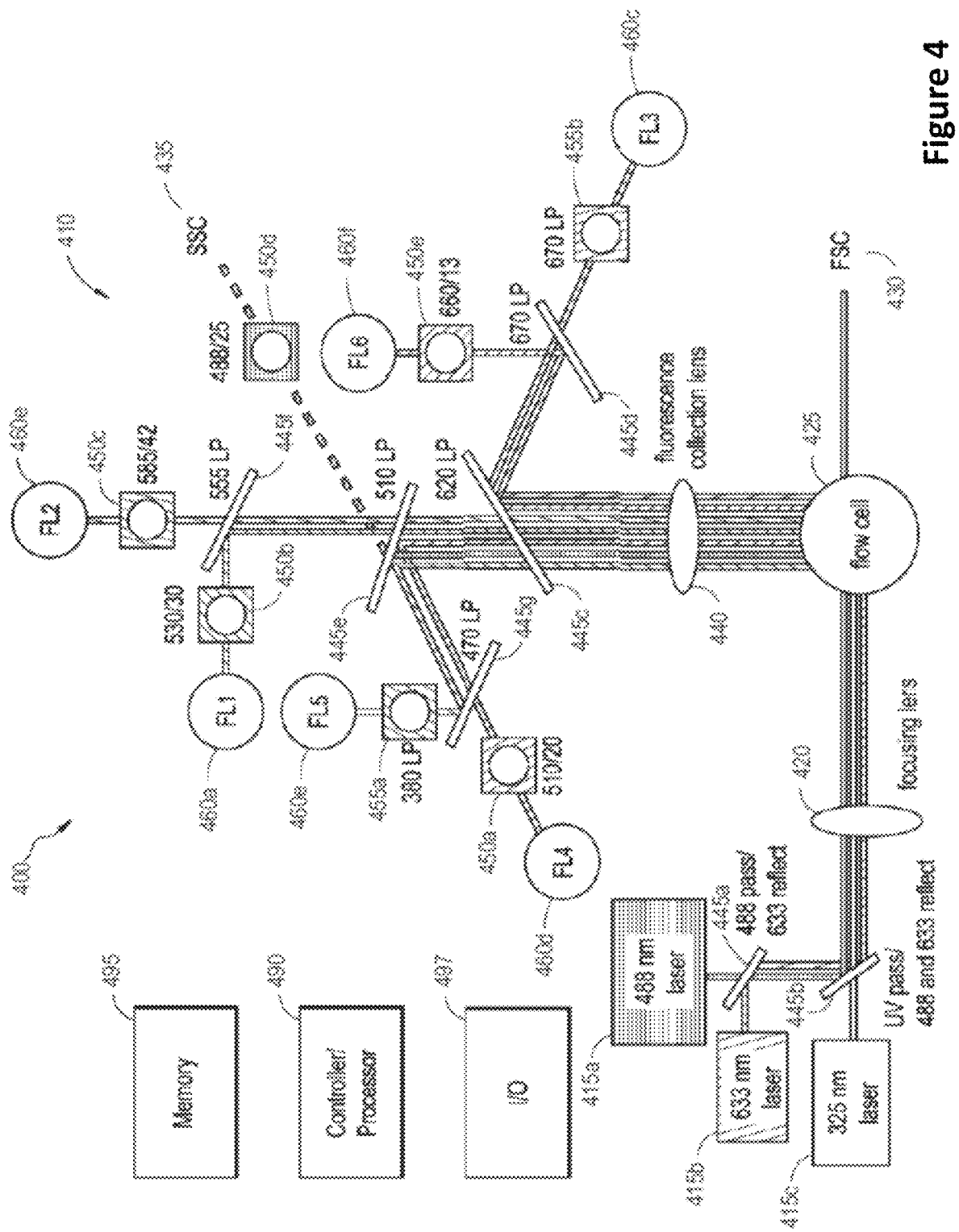
FIG. 4 depicts a flow cytometer according to certain embodiments.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 415a-c emit light in the form of a laser beam. The wavelengths of the laser beams emitted from excitation lasers 415a-415c are 488 nm, 633 nm, and 325 nm, respectively, in the example system of FIG. 4. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system, and the operating system interfaces with firmware and hardware in a well-known manner and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor of the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to the processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via a system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located, or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 8:
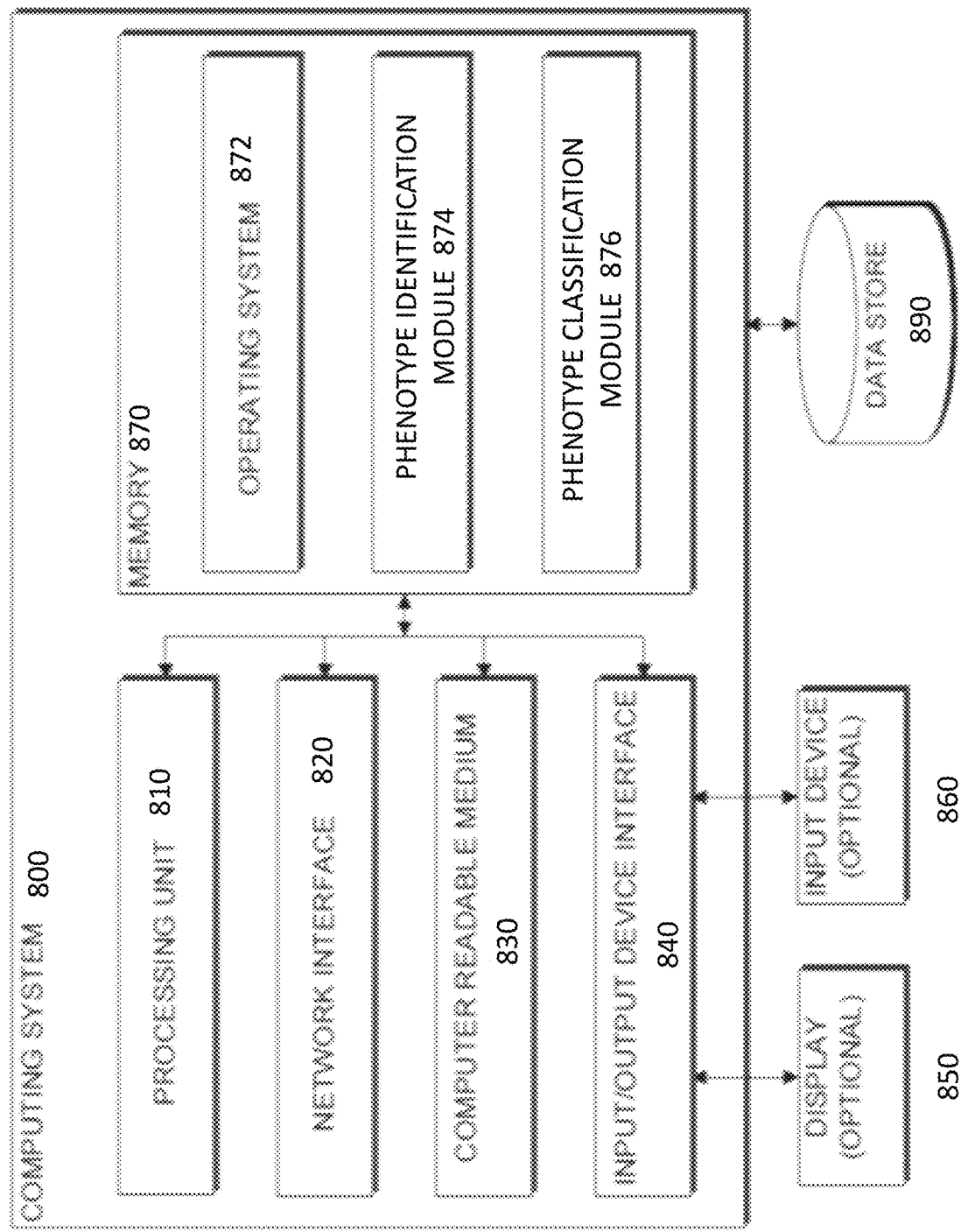
FIG. 8 depicts a block diagram of a computing system according to certain embodiments.

FIG. 8 depicts a general architecture of an example computing device 800 according to certain embodiments. The general architecture of the computing device 800 depicted in FIG. 8 includes an arrangement of computer hardware and software components. The computing device 800 may include many more (or fewer) elements than those shown in FIG. 8. It is not necessary, however, that all of these generally conventional elements be shown in order to provide an enabling disclosure. As illustrated, the computing device 800 includes a processing unit 810, a network interface 820, a computer readable medium drive 830, an input/output device interface 840, a display 850, and an input device 860, all of which may communicate with one another by way of a communication bus. The network interface 820 may provide connectivity to one or more networks or computing systems. The processing unit 810 may thus receive information and instructions from other computing systems or services via a network. The processing unit 810 may also communicate to and from memory 870 and further provide output information for an optional display 850 via the input/output device interface 840. The input/output device interface 840 may also accept input from the optional input device 860, such as a keyboard, mouse, digital pen, microphone, touch screen, gesture recognition system, voice recognition system, gamepad, accelerometer, gyroscope, or other input device.

The memory 870 may contain computer program instructions (grouped as modules or components in some embodiments) that the processing unit 810 executes in order to implement one or more embodiments. The memory 870 generally includes RAM, ROM and/or other persistent, auxiliary or non-transitory computer-readable media. The memory 870 may store an operating system 872 that provides computer program instructions for use by the processing unit 810 in the general administration and operation of the computing device 800. The memory 870 may further include computer program instructions and other information for implementing aspects of the present disclosure.

For example, in one embodiment, the memory 870 includes a cell phenotype identification module 874 for identifying phenotypes of cells in the sample and a cell phenotype classification module 876 for determining whether a cell has a phenotype belonging to a collection of predetermined phenotypes and issuing an instruction for the cell sorter to sort.

In certain embodiments, the subject systems are flow cytometric systems employing the above described algorithm for sorting particles, such as cells, in a sample based on order of identification. Suitable flow cytometry systems may include, but are not limited to, those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Thromb Hemost*. 2004 October; 30(5):502-11; Alison, et al. *J Pathol*, 2010 December; 222(4):335-344; and Herbig, et al. (2007) *Crit Rev Ther Drug Carrier Syst*. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of each of which are herein incorporated by reference in their entirety.

Computer-Readable Storage Medium for Flow Cytometrically Sorting A Sample with Particles, Such as Cells, Based on Order of Identification Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming," where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R magnetic tape, non-volatile memory card, ROM, DVD-ROM, Blue-ray disk, solid state disk, and network attached storage (NAS), whether or not such devices are internal or external to the computer. A file containing information can be "stored" on a computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions having: algorithm for identifying cell phenotypes based on one or more data signals generated from light detected from cells of the sample; and algorithm for instructing a cell sorter to dynamically sort into partitions cells that have a phenotype of a collection of predetermined phenotypes based on order of identification.

The computer readable storage medium may include instructions for capturing one or more images of a flow stream, such as 2 or more images of the flow stream, such as 3 or more images, such as 4 or more images, such as 5 or more images, such as 10 or more images, such as 15 or more images and including 25 or more images. In certain embodiments, the computer readable storage medium includes instructions for optical adjustment of the captured images, such as to enhance the optical resolution of the image. In certain embodiments, computer readable storage medium may include instructions for enhancing the resolution of the captured images by 5% or greater, such as by 10% or greater, such as by 25% or greater, such as by 50% or greater and including enhancing the resolution of the captured images by 75% or greater.

In embodiments, computer readable storage media of interest includes algorithm for instructing the cell sorter to stop sorting a first phenotype from the collection of phenotypes after a predetermined number of cells that have the first phenotype are sorted. In certain embodiments, the computer readable storage media includes algorithm for instructing the cell sorter to dynamically sort a predetermined number of cells into a partition. In other embodiments, computer readable storage media includes algorithm for instructing a support stage to move a multi-well plate to a second well after a predetermined number of cells are sorted into a first well.

The computer readable storage medium may also include algorithm for recording the phenotypes of cells sorted into partitions. In some embodiments, computer readable storage media of interest include algorithm for recording the phenotypes of cells sorted into partitions by adding representations of phenotypes of sorted cells to a list of phenotypes. In such embodiments, computer readable storage media of interest may include algorithm for querying the list of phenotypes to determine whether or not a first cell has already been sorted, wherein the first cell has a phenotype also exhibited by a second cell. In other embodiments, computer readable storage media of interest include algorithm for recording the phenotypes of cells sorted into partitions by adding representations of sorted cells to a probabilistic data structure. In such embodiments, computer readable storage media of interest may include algorithm for querying the probabilistic data structure to determine whether or not a first cell has already been sorted, wherein the first cell has a phenotype also exhibited by a second cell. In some instances, the probabilistic data structure is a Bloom filter. In other embodiments, computer readable storage media of interest include algorithm for recording the phenotypes of cells sorted into partitions by adding representations of phenotypes of sorted cells to an associative array. In such embodiments, computer readable storage media of interest may include algorithm for querying the associative array to determine whether or not a first cell has already been sorted, wherein the first cell has a phenotype also exhibited by a second cell. In some instances, the associative array is a content addressable memory. In some embodiments, computer readable storage media of interest include algorithm for recording the phenotypes of cells sorted into partitions by setting a value at a location in a truth table corresponding to a cell phenotype. In such embodiments, computer readable storage media of interest may include algorithm for querying the truth table to determine whether or not a first cell has already been sorted, wherein the first cell has a phenotype also exhibited by a second cell. In other embodiments, computer readable storage media of interest include algorithm for recording information identifying a partition and a phenotype of a cell sorted into the partition. In such embodiments, computer readable storage media of interest may include algorithm for maintaining a list identifying partitions and phenotypes of cells sorted into the partitions.

The non-transitory computer readable storage medium may also include algorithm for calculating one or more parameters of the particle. In these embodiments, the computer readable storage medium includes algorithm for instructing the cell sorter to: dynamically sort into a first partition cells of the sample that exhibit a first collection of phenotypes, comprising one or more phenotypes, based on order of identification, and dynamically sort into a second partition cells of the sample that do not exhibit the first collection of phenotypes. In such embodiments, computer readable storage media of interest may include algorithm for dynamically updating the first collection of phenotypes based on sorted cells in the sample so that cells sorted into the first partition and cells sorted into the second partition comprise substantially the same number of cells.

The non-transitory computer readable storage medium may also include algorithm for not sorting a cell exhibiting an indeterminate phenotype.

The non-transitory computer readable storage medium may also include algorithm for calculating an estimate of an amount of fluorescent spillover measured with respect to a single data signal based on a predicted variance-covariance matrix of unmixed data for a sorted cell. In such embodiments, computer readable storage media of interest may include algorithm for calculating an estimate of a covariance between two fluorophores based on the predicted variance-covariance matrix of unmixed data for the sorted cell. In such embodiments, computer readable storage media of interest may include algorithm for calculating thresholds for expression for a fluorophore based on the estimated covariance between fluorophores. In such embodiments, computer readable storage media of interest may include algorithm for calculating a measure of uncertainty with respect to the phenotype exhibited by a sorted cell based on the estimated covariance between fluorophores.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Utility

The subject systems, methods and computer systems find use in a variety of applications where it is desirable to analyze and sort particle components, such as cells, in a sample in a fluid medium, such as a biological sample. In some embodiments, the systems and methods described herein find use in flow cytometry characterization of biological samples labeled with fluorescent tags. In other embodiments, the systems and methods find use in spectroscopy of emitted light. In addition, the subject systems and methods find use in improving the efficiency of sorting a sample (e.g., in a flow stream). By improving the efficiency of sorting a sample, it is meant that fewer particles, such as cells, of a sample may be wasted (i.e., disposing of particles such as cells such that they go unused) when sorting a sample when the subject systems and methods are employed. In particular, the subject systems and methods may improve efficiency of sorting and in particular reduce the number of cells wasted when cells with relatively low frequency phenotypes within a sample are sorted. In certain instances, the efficiency of sorting may be improved such that more variations of particles may be collected and sorted when the subject systems and methods are employed. By variations of particles, it is meant, for example, cell phenotypes, such that a larger number of different cell phenotypes are sorted when embodiments of the present disclosure are employed. Embodiments of the present disclosure find use where it is desirable to provide a flow cytometer with improved cell sorting efficiency, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A method of flow cytometrically sorting a sample, the method comprising:
    introducing the sample into a flow cytometer;
    flowing the introduced sample in a flow stream;
    irradiating the sample in the flow stream with a light source;
    detecting light from cells in the sample flowing in the flow stream;
    identifying phenotypes of cells in the sample flowing in the flow stream based on one or more data signals generated from the detected light;
    dynamically sorting into partitions cells of the sample that have a phenotype of a collection of predetermined phenotypes based on order of identification; and
    estimating an amount of fluorescent spillover measured with respect to a single data signal based on a predicted variance-covariance matrix of unmixed data for a sorted cell.

2. The method according to claim 1, further comprising excluding a first phenotype from the collection of phenotypes after sorting a predetermined number of cells that have the first phenotype.

3. The method according to claim 1, wherein a predetermined number of cells are sorted into a partition.

4. The method according to claim 1, wherein the partitions comprise wells.

5. The method according to claim 4, wherein the wells are wells of a multi-well plate.

6. The method according to claim 5, further comprising advancing the multi-well plate to a second well after sorting a predetermined number of cells into a first well.

7. The method according to claim 1, further comprising recording the phenotypes of cells sorted into partitions.

8. The method according to claim 1, further comprising recording information identifying a partition and a phenotype of a cell sorted into the partition.

9. The method according to claim 1, further comprising estimating, based on a subset of cells in the sample, a number of phenotypes exhibited by cells in the sample.

10. The method according to claim 1, wherein sorting cells comprises deflecting cells into a first partition and a second partition.

11. The method according to claim 1, wherein identifying cell phenotypes is based on one or more values of parameters that are determined from the data signals generated from the detected light.

12. The method according to claim 11, wherein certain values of a parameter of a cell indicate an indeterminate state of whether the cell has a phenotype.

13. The method according to claim 12, wherein a cell is not sorted when it exhibits an indeterminate state of whether the cell has a phenotype.

14. The method according to claim 1, further comprising estimating a covariance between two fluorophores based on the predicted variance-covariance matrix of unmixed data for the sorted cell.

15. The method according to claim 14, further comprising defining thresholds for expression for a fluorophore based on the estimated covariance between fluorophores.

16. The method according to claim 15, further comprising defining a measure of uncertainty with respect to the phenotype exhibited by a sorted cell based on the estimated covariance between fluorophores.

17. The method according to claim 1, wherein the collection of predetermined phenotypes comprises a cell type with one or more cell subtypes.

18. The method according to claim 1, wherein the flow stream is irradiated with a light source at a wavelength from 200 nm to 800 nm.

19. The method according to claim 18, wherein the method comprises irradiating the flow stream with a first beam of frequency shifted light and second beam of frequency shifted light.

* * * * *